United States Patent
Niwa et al.

(10) Patent No.: US 11,002,213 B2
(45) Date of Patent: May 11, 2021

(54) INTERNAL COMBUSTION ENGINE CONTROL DEVICE AND CONTROL METHOD

(71) Applicant: TOYOTA JIDOSHA KABUSHIKI KAISHA, Toyota (JP)

(72) Inventors: Takahiko Niwa, Komaki (JP); Masanori Toya, Toyota (JP); Takashi Yoshida, Nagoya (JP); Takayuki Omachi, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/643,876

(22) PCT Filed: Aug. 23, 2018

(86) PCT No.: PCT/JP2018/031129
§ 371 (c)(1),
(2) Date: Mar. 3, 2020

(87) PCT Pub. No.: WO2019/049676
PCT Pub. Date: Mar. 14, 2019

(65) Prior Publication Data
US 2020/0400091 A1 Dec. 24, 2020

(30) Foreign Application Priority Data

Sep. 5, 2017 (JP) .............................. JP2017-170476
Mar. 27, 2018 (JP) .............................. JP2018-060404
(Continued)

(51) Int. Cl.
*F02D 41/34* (2006.01)
*F02D 13/02* (2006.01)
(Continued)

(52) U.S. Cl.
CPC ....... *F02D 41/345* (2013.01); *F02D 13/0223* (2013.01); *F02D 13/0261* (2013.01);
(Continued)

(58) Field of Classification Search
CPC .. F02D 41/345; F02D 41/008; F02D 13/0261; F02D 13/023; F02D 13/0223;
(Continued)

(56) References Cited

U.S. PATENT DOCUMENTS 5,320,079 A 6/1994 Kuwabara
6,062,201 A * 5/2000 Nozawa ............... F02D 13/0219
123/478

(Continued)

FOREIGN PATENT DOCUMENTS

EP 2 397 680 12/2011
JP 2-301636 12/1990
(Continued)

OTHER PUBLICATIONS

JP H2-301636—An English language translation of this document is enclosed.
(Continued)

*Primary Examiner* — George C Jin
(74) *Attorney, Agent, or Firm* — Finnegan, Henderson, Farabow, Garrett & Dunner, LLP

(57) ABSTRACT

Provided are an internal combustion engine control device and control method in which a multi-injection process comprises performing an intake synchronized injection and an intake asynchronous injection to inject a required injection amount of fuel by operating a port injection valve for injecting fuel into an intake passageway. A variable process includes variably setting an injection timing for the intake synchronized injection on the basis of at least two of three parameters. The injection timing for the intake synchronized
(Continued)

injection is expressed by the rotation angle of a crank shaft of an internal combustion engine. The three parameters include a rotational speed of the crank shaft of the internal combustion engine, a valve-opening start timing of an intake valve, and a temperature of an intake system of the internal combustion engine.

10 Claims, 12 Drawing Sheets

(30) Foreign Application Priority Data

| | | | |
|---|---|---|---|
| Mar. 27, 2018 | (JP) | ............................. | JP2018-060412 |
| May 11, 2018 | (JP) | ............................. | JP2018-092491 |
| May 17, 2018 | (JP) | ............................. | JP2018-095429 |
| May 17, 2018 | (JP) | ............................. | JP2018-095430 |
| May 17, 2018 | (JP) | ............................. | JP2018-095434 |
| Jun. 15, 2018 | (JP) | ............................. | JP2018-114649 |
| Jul. 6, 2018 | (JP) | ............................. | JP2018-128754 |

(51) Int. Cl.
*F02D 41/00* (2006.01)
*F02D 41/14* (2006.01)
*F02D 41/02* (2006.01)

(52) U.S. Cl.
CPC ......... *F02D 41/008* (2013.01); *F02D 41/024* (2013.01); *F02D 41/1454* (2013.01); *F02D 2200/0414* (2013.01); *F02D 2200/0802* (2013.01); *F02D 2200/101* (2013.01)

(58) Field of Classification Search
CPC ............... F02D 41/1454; F02D 41/024; F02D 2200/0802; F02D 2200/101; F02D 2200/0414
See application file for complete search history.

(56) References Cited

U.S. PATENT DOCUMENTS

| | | | | |
|---|---|---|---|---|
| 2004/0181331 | A1* | 9/2004 | Nagaishi | ............... F02D 35/025 701/104 |
| 2015/0240737 | A1* | 8/2015 | Surnilla | .............. F02D 41/3005 123/435 |
| 2016/0053693 | A1* | 2/2016 | Hokuto | ................... F02D 41/04 60/285 |
| 2018/0202383 | A1* | 7/2018 | Alrefaai | .............. F02D 41/1402 |

FOREIGN PATENT DOCUMENTS

| | | |
|---|---|---|
| JP | 5-214985 | 8/1993 |
| JP | 5-256172 | 10/1993 |
| JP | 7-127514 | 5/1995 |
| JP | 11-30142 | 2/1999 |
| JP | 11-36943 | 2/1999 |
| JP | 2003-222049 | 8/2003 |
| JP | 2004-092488 | 3/2004 |
| JP | 2005-023850 | 1/2005 |
| JP | 2005-291133 | 10/2005 |
| JP | 2006-322339 | 11/2006 |
| JP | 2007-224753 | 9/2007 |
| JP | 2007-224810 | 9/2007 |
| JP | 2007-239583 | 9/2007 |
| JP | 2010-285908 | 12/2010 |
| JP | 2011-149333 | 8/2011 |
| JP | 2012-002103 | 1/2012 |
| JP | 2012-102674 | 5/2012 |
| JP | 2012-136959 | 7/2012 |
| JP | 2012136959 A * | 7/2012 |
| JP | 2013-209938 | 10/2013 |
| JP | 2014-211130 | 11/2014 |
| JP | 2014-234730 | 12/2014 |
| JP | 2015-059456 | 3/2015 |
| JP | 2015-169171 | 9/2015 |
| JP | 2017-115579 | 6/2017 |
| JP | 2019-190448 | 10/2019 |

OTHER PUBLICATIONS

JP 5-214985—An English language abstract of this document is enclosed. Upon information and belief, this document is a counterpart of listed U.S. Pat. No. 5,320,079.
JP 5-256172—An English language translation of this document is enclosed.
JP 7-127514—An English language abstract of this document is enclosed.
JP 11-030142—An English language abstract of this document is enclosed. Upon information and belief, this document is a counterpart of listed U.S. Pat. No. 6,062,201.
JP 11-036943—An English language translation of this document is enclosed.
JP 2003-222049—An English language translation of this document is enclosed.
JP 2004-092488—An English language translation of this document is enclosed.
JP 2005-023850—An English language translation of this document is enclosed.
JP 2005-291133—An English language translation of this document is enclosed. In addition, this document is mentioned in the specification of the present application at p. 1.
JP 2006-322339—An English language translation of this document is enclosed.
JP 2007-224810—An English language translation of this document is enclosed.
JP 2007-224753—An English language translation of this document is enclosed.
JP 2007-239583—An English language translation of this document is enclosed.
JP 2010-285908—An English language translation of this document is enclosed.
JP 2011-149333—An English language translation of this document is enclosed.
JP 2012-002103—An English language translationof this document is enclosed. Upon information and belief, this document is a counterpart of listed EP 2397680A2.
JP 2012-102674—An English language translationof this document is enclosed.
JP 2012-136959—An English language translationof this document is enclosed.
JP 2013-209938—An English language translationof this document is enclosed.
JP 2014-211130—An English language translation of this document is enclosed.
JP 2014-234730—An English language translation of this document is enclosed.
JP 2015-059456—An English language translation of this document is enclosed. In addition, this document is mentioned in the specification of the present application at p. 1.
JP 2015-169171—An English language translation of this document is enclosed.
JP 2017-115579—An English language translation of this document is enclosed.
JP 2019-190448—An English language translation of this document is enclosed.

* cited by examiner

INTERNAL COMBUSTION ENGINE CONTROL DEVICE AND CONTROL METHOD

CROSS-REFERENCE TO RELATED APPLICATIONS

This application is a national stage application of International Application No. PCT/JP2018/031129, filed Aug. 23, 2018, and which is based upon and claims the benefit of priority from Japanese Patent Application Nos. 2017-170476, filed Sep. 5, 2017; 2018-060404, filed Mar. 27, 2018; 2018-060412, filed Mar. 27, 2018; 2018-092491, filed May 11, 2018; 2018-095429, filed May 17, 2018; 2018-095430, filed May 17, 2018; 2018-095434, filed May 17, 2018; 2018-114649, filed June 15, 2018; and 2018-128754, filed Jul. 6, 2018, the entire contents of which are incorporated herein by reference.

TECHNICAL FIELD

The present disclosure relates to a control device and a control method for an internal combustion engine. The control device and the control method are applied to an internal combustion engine including a port injection valve that injects fuel into an intake passage. The internal combustion engine may further include a catalyst that purifies exhaust gas discharged to an exhaust passage.

BACKGROUND ART

Patent Document 1 describes an example of a control device that executes a multiple injection process. In the multiple injection process, fuel that is to be injected into a single cylinder in a single combustion cycle is split into the discharge stroke and the intake stroke. Paragraphs [0017] and [0024] of this document describe that the control device sets the injection timing in the intake stroke to be a timing that has been determined in advance.

Patent Document 2 describes an example of a control device according to a second embodiment that injects a necessary amount (requested injection amount) of fuel in a single combustion cycle determined in accordance with an intake air amount by splitting the necessary amount of the fuel into two in a high-load region.

PRIOR ART DOCUMENTS

Patent Document

Patent Document 1: Japanese Laid-Open Patent Publication No. 2005-291133
Patent Document 2: Japanese Laid-Open Patent Publication No. 2015-59456

SUMMARY OF THE INVENTION

Problems that the Invention is to Solve

Fixing the injection timing may cause a problem to control exhaust components in a favorable manner.

Means for Solving the Problem

Examples of the present disclosure will now be described.
Example 1: A control device for an internal combustion engine is provided. The internal combustion engine to which the control device is applied includes a port injection valve that injects fuel into an intake passage. The control device is configured to execute a multiple injection process for executing an intake synchronous injection and an intake asynchronous injection to inject fuel of a requested injection amount by operating the port injection valve, the requested injection amount being requested in a single combustion cycle, the intake synchronous injection injecting fuel in synchronization with an open period of an intake valve, the intake asynchronous injection injecting fuel at a timing advanced with respect to a timing of the intake synchronous injection and a variably setting process for variably setting an injection timing of the intake synchronous injection based on at least two parameters of three parameters, the injection timing of the intake synchronous injection being represented by a rotation angle of a crankshaft of the internal combustion engine, the three parameters referring to a rotation speed of the crankshaft of the internal combustion engine, an opening start timing of the intake valve, and a temperature of an intake system of the internal combustion engine.

If the fuel of the requested injection amount is all injected with the intake asynchronous injection when the temperature of the intake system of the internal combustion engine is low, the number (PN) of particulate matter (PM) in exhaust gas may increase depending on load. This is because when the amount of fuel collecting on the intake system increases, shearing the collected fuel presumably causes some of the collected fuel to flow into the in a state in which they remain droplets, thereby generating PM. In the above-described configuration, some of the requested injection amount is injected using the intake synchronous injection. This reduces the asynchronous injection amount and consequently reduces the amount of fuel collecting on the intake system. That is, this prevents situations in which shearing the collected fuel causes the fuel to flow into the combustion chamber in a state in which the fuel remains droplets.

The inventor found out that the number (PN) of particulate matter (PM) in exhaust gas greatly changes depending on the injection timing in the intake stroke. Thus, for example, fixing the injection timing may cause a problem to control exhaust components in a favorable manner. The above-described configuration deals with such a problem.

More specifically, the inventor found out that the injection timing of the intake synchronous injection for maximally reducing PN changes depending on the rotation speed of the crankshaft. This is presumably because since the flow speed in the intake passage changes depending on the rotation speed, the amount of fuel collecting on and remaining in the intake system without flowing into the combustion chamber tends to change. Further, the rotation amount of the crankshaft presumably changes during a period in which a predetermined amount of fuel vaporizes in the fuel injected from the port injection valve. In the above-described configuration, PN can be reduced by variably setting the injection timing of the intake synchronous injection in accordance with the rotation speed as compared to when, for example, the injection timing is not variable depending on the rotation speed.

In addition, the inventor found out that the injection timing of the intake synchronous injection for maximally reducing PN changes depending on the opening start timing of the intake valve. This is presumably because when the overlap amount of the intake valve and the exhaust valve changes in accordance with the opening start timing, an internal EGR amount changes. Thus, the ease of vaporization of the fuel in the intake system changes as the temperature of the intake system increases. Further, the amount of fuel collecting on and remains in the without flowing into the combustion chamber presumably changes. In the above-described configuration, PN can be reduced by variably setting the injection timing of the intake synchronous injection in accordance with the opening start timing of the intake valve as compared to when, for example, the injection timing is not variable depending on the opening start timing of the intake valve.

Additionally, the inventor found out that the injection timing of the intake synchronous injection for maximally reducing PN changes depending on the temperature of the intake system. This is presumably because the temperature of the intake system differentiates the ease of vaporization of fuel in the intake system. In the above-described configuration, PN can be reduced by variably setting the injection timing of the intake synchronous injection in accordance with the temperature of the intake system as compared to when, for example, the injection timing is not variable depending on the temperature of the intake system.

Example 2: In the control device according to Example 1, the control device is further configured to execute a requested injection amount calculation process for calculating the requested injection amount as an injection amount to control an air-fuel ratio to a target air-fuel ratio based on an amount of fresh air filling a cylinder of the internal combustion engine, and the variably setting process is a process for variably setting the injection timing of the intake synchronous injection based on load of the internal combustion engine in addition to the at least two parameters.

The inventor found out that the injection timing for maximally reducing PN changes depending on the load of the internal combustion engine. This is presumably because the ease of vaporization of fuel changes depending on a change in the amount of fuel to be injected and a change in the pressure in the intake passage. In the above-described configuration, the injection timing of the intake synchronous injection is variably set in accordance with the load. Accordingly, as compared to when, for example, the injection timing is not variable in accordance with the load, PN can be reduced.

Example 3: In the control device according to Example 2, the variably setting process includes an end timing setting process for variably setting a reach end timing based on the rotation speed, the temperature of the intake system, and the load, the reach end timing being a target value of a timing at which fuel injected from the port injection valve at a latest timing reaches an inlet of a combustion chamber of the internal combustion engine and a start timing calculation process for calculating an injection start timing of the intake synchronous injection based on the reach end timing.

The inventor has found out that PN greatly varies depending on variation in the timing at which the fuel injected at the latest timing reaches the inlet of the combustion chamber of the internal combustion engine and the optimal timing of reducing PN hardly changes even if the injection ratio, of the intake synchronous injection to the intake asynchronous injection is changed to a certain extent. In the above-described configuration, after the reach end timing is set, the injection start timing of the intake synchronous injection is set. Thus, the proper timing for reducing PN can be managed using the reach end timing, which is a parameter handled by the control device.

Example 4: In the control device according to Example 3, the internal combustion engine includes a valve actuation variable device configured to vary a valve actuation of the intake valve. The control device is further configured to execute a valve actuation controlling process for variably controlling the opening start timing of the intake valve by operating the valve actuation variable device. The end timing setting process includes a retardation amount calculation process for calculating a retardation amount of the reach end timing with respect to the opening start timing of the intake valve based on the rotation speed, the temperature of the intake system, and the load. The end timing setting process is a process for setting, as the reach end timing, a timing retarded by the retardation amount with respect to the opening start timing of the intake valve.

The inventor found out that the injection timing of the intake synchronous injection for maximally reducing PN changes depending on the opening start timing of the intake valve. This is presumably because when the overlap amount of the intake valve and the exhaust valve changes in accordance with the opening start timing, an internal EGR amount changes. Thus, the ease of vaporization of the fuel in the intake system changes as the temperature of the intake system increases, and the amount of fuel collecting on and remaining in the intake system without flowing into the combustion chamber changes. In the above-described configuration, the injection timing of the intake synchronous injection is variably set in accordance with the opening start timing of the intake valve. Accordingly, as compared to when, for example, the injection timing is not variable in accordance with the opening start timing of the intake valve, PN can be reduced.

Particularly, in the above-described configuration, instead of directly calculating the reach end timing, the retardation amount the reach end timing with respect to the opening start timing of the intake valve is calculated. Thus, the reach end timing can be variably set in accordance with the opening start timing of the intake valve without using the opening start timing of the intake valve for a parameter used to calculate the retardation amount.

Example 5: In the control device according to Example 1 or 2, the variably setting process includes an end timing setting process for variably setting a reach end timing based on the rotation speed of the crankshaft, the reach end timing being a target value of a timing at which fuel injected from the port injection valve at a latest timing reaches an inlet of a combustion chamber of the internal combustion engine and a start timing calculation process for calculating an injection start timing of the intake synchronous injection based on the reach end timing.

If the fuel of the requested injection amount is all injected with the intake asynchronous injection when the temperature of the intake system of the internal combustion engine is low, the number (PN) of particulate matter (PM) in exhaust gas may increase depending on load. This is because when the amount of fuel collecting on the intake system increases, shearing the collected fuel presumably causes some of the collected fuel to flow into the in a state in which they remain droplets, thereby generating PM. In the above-described configuration, some of the requested injection amount is injected using the synchronous injection. This reduces the asynchronous injection amount and consequently reduces the amount of fuel collecting on the intake system. This prevents situations in which shearing the collected fuel causes the fuel to flow into the combustion chamber in a state in which the fuel remains droplets.

The inventor has found out that PN greatly varies depending on variation in the timing at which the fuel injected at the latest timing reaches the inlet of the combustion chamber of the internal combustion engine and the optimal timing of reducing PN hardly changes even if the injection ratio of the intake synchronous injection to the intake asynchronous injection is changed to a certain extent. In the above-described configuration, after the reach end timing is set, the injection start timing is set. Thus, the proper timing for reducing PN can be managed using the reach end timing, which is a parameter handled by the control device.

More specifically, the inventor found out that the reach end timing for maximally reducing PN changes depending on the rotation speed of the crankshaft. This is presumably because since the flow speed in the intake passage changes depending on the rotation speed, the amount of fuel collecting on and remaining in the intake system without flowing into the combustion chamber tends to change. Further, the rotation amount of the crankshaft presumably changes during a period in which a predetermined amount of fuel vaporizes in the fuel injected from the port injection valve. In the above-described configuration, the reach end timing is variably set in accordance with the rotation speed. Accordingly, as compared to when, for example, the injection timing is not variable in accordance with the rotation speed, PN can be reduced.

Example 6: In the control device according to Example 5, the end timing setting process includes a process for variably setting the reach end timing based on the load of the internal combustion engine in addition to the rotation speed.

Example 7: In the control device according to Example 6, the internal combustion engine includes a valve actuation variable device configured to vary a valve actuation of the intake valve. The control device further executes a valve actuation controlling process for variably controlling the opening start timing of the intake valve by operating the valve actuation variable device. The end timing setting process includes a retardation amount calculation process for calculating a retardation amount of the reach end timing with respect to the opening start timing of the intake valve based on the rotation speed and the load. The end timing setting process is a process for setting, as the reach end timing, a timing retarded by the retardation amount with respect to the opening start timing of the intake valve.

More specifically, the inventor found out that the reach end timing for maximally reducing PN changes depending on the opening start timing of the intake valve. This is presumably because when the overlap amount of the intake valve and the exhaust valve changes in accordance with the opening start timing, an internal EGR amount changes. Thus, the ease of vaporization of the fuel in the intake system changes as the temperature of the intake system increases, and the amount of fuel collecting on and remaining in the intake system without flowing into the combustion chamber changes. In the above-described configuration, the reach end timing is variably set in accordance with the opening start timing of the intake valve. Accordingly, as compared to when, for example, the injection timing is not variable in accordance with the opening start timing of the intake valve, PN can be reduced.

Particularly, in the above-described configuration, instead of directly calculating the reach end timing, the retardation amount the reach end timing with respect to the opening start timing of the intake valve is calculated. Thus, the reach end timing can be variably set in accordance with the opening start timing of the intake valve without using the opening start timing of the intake valve for a parameter used to calculate the retardation amount of the reach end timing.

Example 8: In the control device according to any one of Examples 1 to 7, the internal combustion engine further includes a catalyst that purifies exhaust gas discharged to an exhaust passage. The requested injection amount is a fuel amount injected from the port injection valve in the multiple injection process in order to control an air-fuel ratio to a target air-fuel ratio. The control device is further configured to execute an advancement process for setting the injection timing of the intake synchronous injection to be more advanced when a temperature of the catalyst is low than when the temperature of the catalyst is high.

The invention found out that the optimal injection timing of the intake synchronous injection for reducing PN is more retarded than the optimal injection timing of the intake synchronous injection for reducing HC. In the above-described configuration, the injection timing of the intake synchronous injection is set to be more advanced when the temperature of a catalyst having a low removal ability using a catalyst is low than when the temperature of the catalyst is high. Thus, the suitable injection timing for reducing the HC concentration in exhaust gas can be set when the removal ability of HC in exhaust gas is low, and the suitable injection timing for reducing PN can be set in a case in which HC can be removed even if the HC concentration in exhaust gas is high.

The inventor considered the multiple injection process for injecting some of the requested injection amount using the intake asynchronous injection that injects fuel in synchronization with the open period of the intake valve and injecting the remaining amount using the intake asynchronous injection that is executed at a more advanced timing than the intake synchronous injection. The inventor found out that the number (PN) of particulate matter (PM) in exhaust gas greatly changes depending on the injection timing in the intake stroke. The invention also found out that when the injection timing of the intake synchronous injection is a suitable timing for reducing PN, the HC concentration in exhaust gas may increase. The above-described configuration deals with such a concern.

Example 9: In the control device according to Example 8, the internal combustion engine includes a valve actuation variable device configured to vary a valve actuation of the intake valve. The control device is further configured to execute a valve actuation controlling process for variably controlling an opening start timing of the intake valve by operating the valve actuation variable device.

The variably setting process variably sets the injection timing of the intake synchronous injection in accordance with the opening start timing of the intake valve. The variably setting process includes a reference timing setting process for setting the injection start timing of the intake synchronous injection based on the opening start timing of the intake valve, a guard value setting process for setting, in accordance with the temperature of the intake system of the internal combustion engine, a retarded guard value for a case of when the temperature of the catalyst is less than a given value, and a low-temperature timing setting process for setting, as the injection timing of the intake synchronous injection, a more advanced timing of the retarded guard value and an injection timing set through the reference timing setting process when the temperature of the catalyst is less than the given value. The variably setting process is a process for setting, as the injection timing of the intake synchronous injection, the injection timing set through the reference timing setting process when the temperature of the catalyst is greater than or equal to the given value.

The inventor found out that the injection timing of the intake synchronous injection for maximally reducing PN changes depending on the opening start timing of the intake valve. This is presumably because when the overlap amount of the intake valve and the exhaust valve changes in accordance with the opening start timing, an internal EGR amount changes. Thus, the ease of vaporization of the fuel in the intake system changes as the temperature of the intake system increases, and the amount of fuel collecting on and remaining in the intake system without flowing into the combustion chamber changes. In the above-described configuration, the injection timing of the intake synchronous injection is variably set in accordance with the opening start timing of the intake valve. Accordingly, as compared to when, for example, the injection timing is not variable in accordance with the opening start timing of the intake valve, PN can be reduced.

When the temperature of the catalyst is low, the temperature of the intake system greatly affects the setting of the injection timing required to prevent the concentration of HC in exhaust gas from increasing. In the above-described configuration, the retarded guard value is set depending on the temperature of the intake system. More specifically, the guard process is implemented to set the retarded guard value as the limit value of the retarded side with respect to the injection timing that is set through the reference timing setting process, which is the suitable injection timing for reducing PN. Thus, a suitable synchronous injection timing for reducing PN and a suitable timing for reducing HC can be properly set.

Example 10: A control device for an internal combustion engine is provided. The control device is applied to the internal combustion engine that includes a port injection valve that injects fuel into an intake passage. The control device is configured to execute a multiple injection process for executing an intake synchronous injection and an intake asynchronous injection to inject fuel of a requested injection amount by operating the port injection valve, the requested injection amount being requested in a single combustion cycle, the intake synchronous injection injecting fuel in synchronization with an open period of an intake valve, the intake asynchronous injection injecting fuel at a timing advanced with respect to a timing of the intake synchronous injection and a variably setting process for variably setting an injection timing of the intake synchronous injection represented by a rotation angle of a crankshaft of the internal combustion engine. The variably setting process includes an end timing setting process for variably setting a reach end timing based on a rotation speed of the crankshaft, the reach end timing being a target value of a timing at which fuel injected from the port injection valve at a latest timing reaches an inlet of a combustion chamber of the internal combustion engine and a start timing calculation process for calculating an injection start timing of the intake synchronous injection based on the reach end timing.

Example 11: A control device for an internal combustion engine is provided. The internal combustion engine to which the control device is applied includes a port injection valve that injects fuel into an intake passage and a catalyst that purifies exhaust gas discharged to an exhaust passage. The control device is configured to execute a multiple injection process for executing an intake synchronous injection and an intake asynchronous injection to inject fuel of a requested injection amount for controlling an air-fuel ratio to a target air-fuel ratio by operating the port injection valve, the requested injection amount being requested in a single combustion cycle, the intake synchronous injection injecting fuel in synchronization with an open period of an intake valve, the intake asynchronous injection injecting fuel at a timing advanced with respect to a timing of the intake synchronous injection and an advancement process for setting the injection timing of the intake synchronous injection to be more advanced when a temperature of the catalyst is low than when the temperature of the catalyst is high.

Example 12: A control method for an internal combustion engine that executes the various processes described in Examples 1 to 11 is provided.

Example 13: A control method for an internal combustion engine that executes the various processes described in Example 11 is provided.

Example 14: A non-transitory computer readable memory medium is provided that stores a program that causes a processor to execute the various processes described in Examples 1 to 11.

Example 15: In the control device according to Example 8, the control device is further configured to execute a requested injection amount calculation process for calculating the requested injection amount based on an amount of air filling a cylinder of the internal combustion engine, and the variably setting process includes a process for variably setting the injection timing of the intake synchronous injection in accordance with the rotation speed of the crankshaft of the internal combustion engine and the load of the internal combustion engine in addition to the opening start timing of the intake valve.

The inventor found out that the injection timing of the intake synchronous injection for maximally reducing PN changes depending on the rotation speed of the crankshaft. One of the reasons for this is presumably that since the flow speed in the intake passage changes depending on the rotation speed, the amount of fuel collecting on and remaining in the intake system without flowing into the combustion chamber tends to change. Further, the rotation amount of the crankshaft presumably changes during a period in which a predetermined amount of fuel vaporizes in the fuel injected from the port injection valve. In the above-described configuration, the injection timing of the intake synchronous injection is variably set in accordance with the rotation speed. Accordingly, as compared to when, for example, the injection timing is not variable in accordance with the rotation speed, PN can be reduced.

The inventor also found out that the injection timing for maximally reducing PN changes depending on the load of the internal combustion engine. This is presumably because the ease of vaporization of fuel changes depending on a change in the amount of fuel to be injected and a change in the pressure in the intake passage. In the above-described configuration, the injection timing of the intake synchronous injection is variably set in accordance with the load. Accordingly, as compared to when, for example, the injection timing is not variable in accordance with the load, PN can be reduced.

Example 16: In the control device according to Example 15, the variably setting process is a process for variably setting the injection timing of the intake synchronous injection in accordance with the temperature of the intake system of the internal combustion engine in addition to the opening start timing of the intake valve, the rotation speed, and the load.

The inventor found out that the injection timing of the intake synchronous injection for maximally reducing PN changes depending on the temperature of the intake system. This is presumably because the temperature of the intake system differentiates the ease of vaporization of fuel in the intake system. In the above-described configuration, the injection timing of the intake synchronous injection is variably set in accordance with the temperature of the intake system. Accordingly, as compared to when, for example, the injection timing is not variable in accordance with the temperature of the intake system, PN can be reduced.

MODES FOR CARRYING OUT THE INVENTION

First Embodiment

A control device for an internal combustion engine according to a first embodiment of the present disclosure will now be described with reference to FIGS. 1 to 5.

Figure 1:
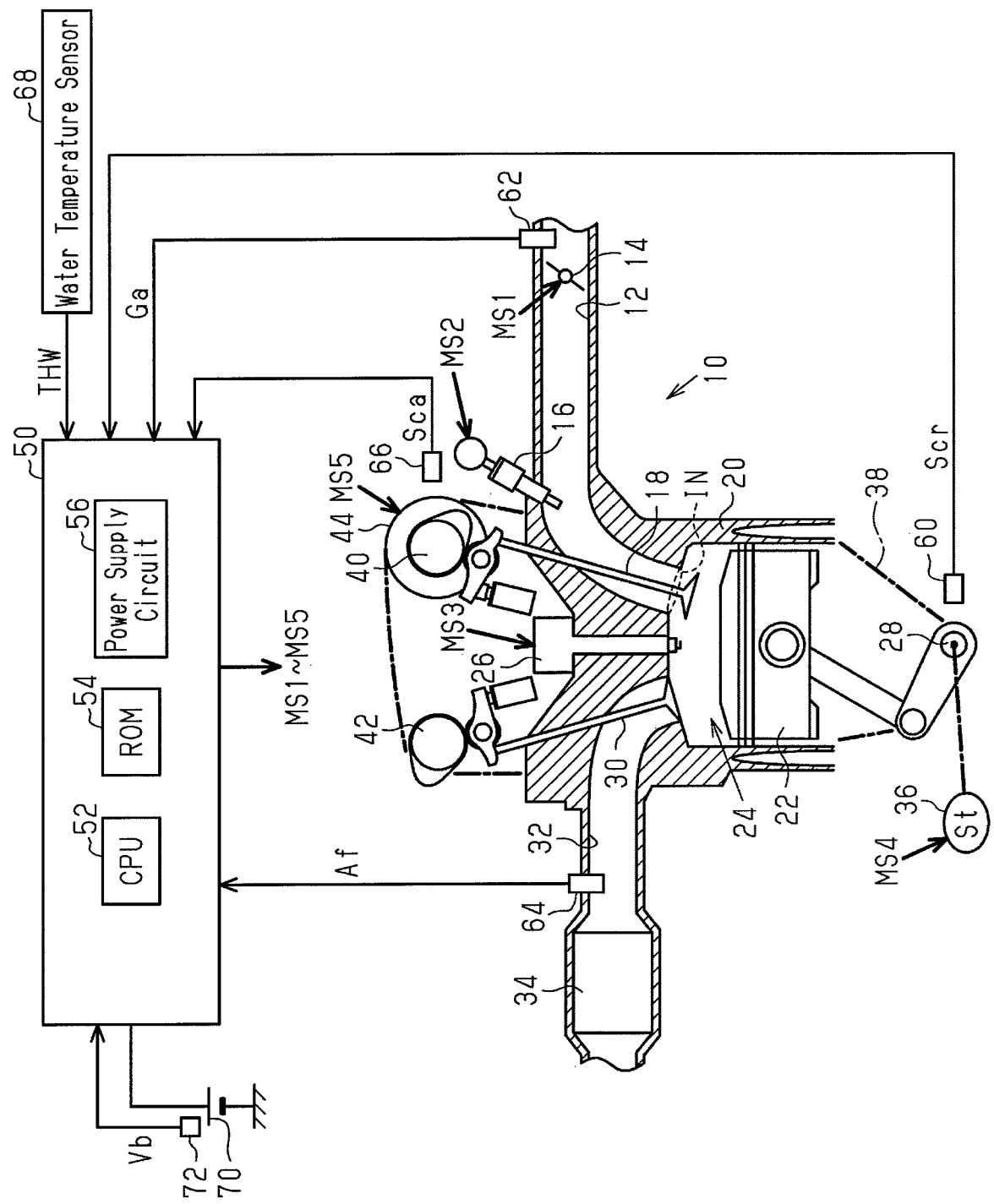
FIG. 1 is a diagram showing a control device and an internal combustion engine according to a first embodiment of the present disclosure.

FIG. 1 shows an internal combustion engine 10 installed in a vehicle. The internal combustion engine 10 includes an intake passage 12. The intake passage 12 includes, sequentially from the upstream side, a throttle valve 14 and a port injection valve 16. The air drawn into the intake passage 12 and the fuel injected from the port injection valve 16 flow into a combustion chamber 24, which is defined by a cylinder 20 and a piston 22, as the intake valve 18 opens. The air-fuel mixture of fuel and air drawn into the combustion chamber 24 is burned by the spark discharge of an ignition device 26. The energy generated through the combustion is converted into rotation energy of a crankshaft 28 by the piston 22. The burned air-fuel mixture is discharged to the exhaust passage 32 as exhaust gas when an exhaust valve 30 opens. The exhaust passage 32 includes a catalyst 34.

The rotation power of the crankshaft 28 is transmitted through a timing chain 38 to an intake camshaft 40 and an exhaust camshaft 42. In the present embodiment, the power of the timing chain 38 is transmitted to the intake camshaft 40 through an intake valve timing adjustment device 44. The intake valve timing adjustment device 44 is an actuator that adjusts a valve-opening timing of the intake valve 18 by adjusting a rotation phase difference between the crankshaft 28 and the intake camshaft 40.

The control device 50 controls the internal combustion engine 10. In order to control a control amount (for example, torque or exhaust component ratio) of the internal combustion engine 10, the control device 50 operates operation units of the internal combustion engine 10 such as the throttle valve 14, the port injection valve 16, the ignition device 26, and the intake valve timing adjustment device 44. The control device 50 refers to an output signal Scr of a crank angle sensor 60, an intake air amount Ga, which is detected by an airflow meter 62, an air-fuel ratio Af, which is detected by an air-fuel ratio sensor 64, an output signal Sca of an intake cam angle sensor 66, the temperature of coolant (water temperature THW) of the internal combustion engine 10, which is detected by a water temperature sensor 68. Further, the control device 50 refers to a terminal voltage Vb of a battery 70, which is detected by a voltage sensor 72. The battery 70 serves as the power supply of the port injection valve 16 or the like. FIG. 1 shows operation signals MS1 to MS5, which are respectively used to operate the throttle valve 14, the port injection valve 16, the ignition device 26, a starter motor 36, and the intake valve timing adjustment device 44.

The control device 50 includes a CPU 52, a ROM 54, and a power supply circuit 56. The CPU 52 executes programs stored in the ROM 54. Thus, the above-described control amounts are controlled. The power supply circuit 56 supplies power to each part in the control device 50.

Figure 2:
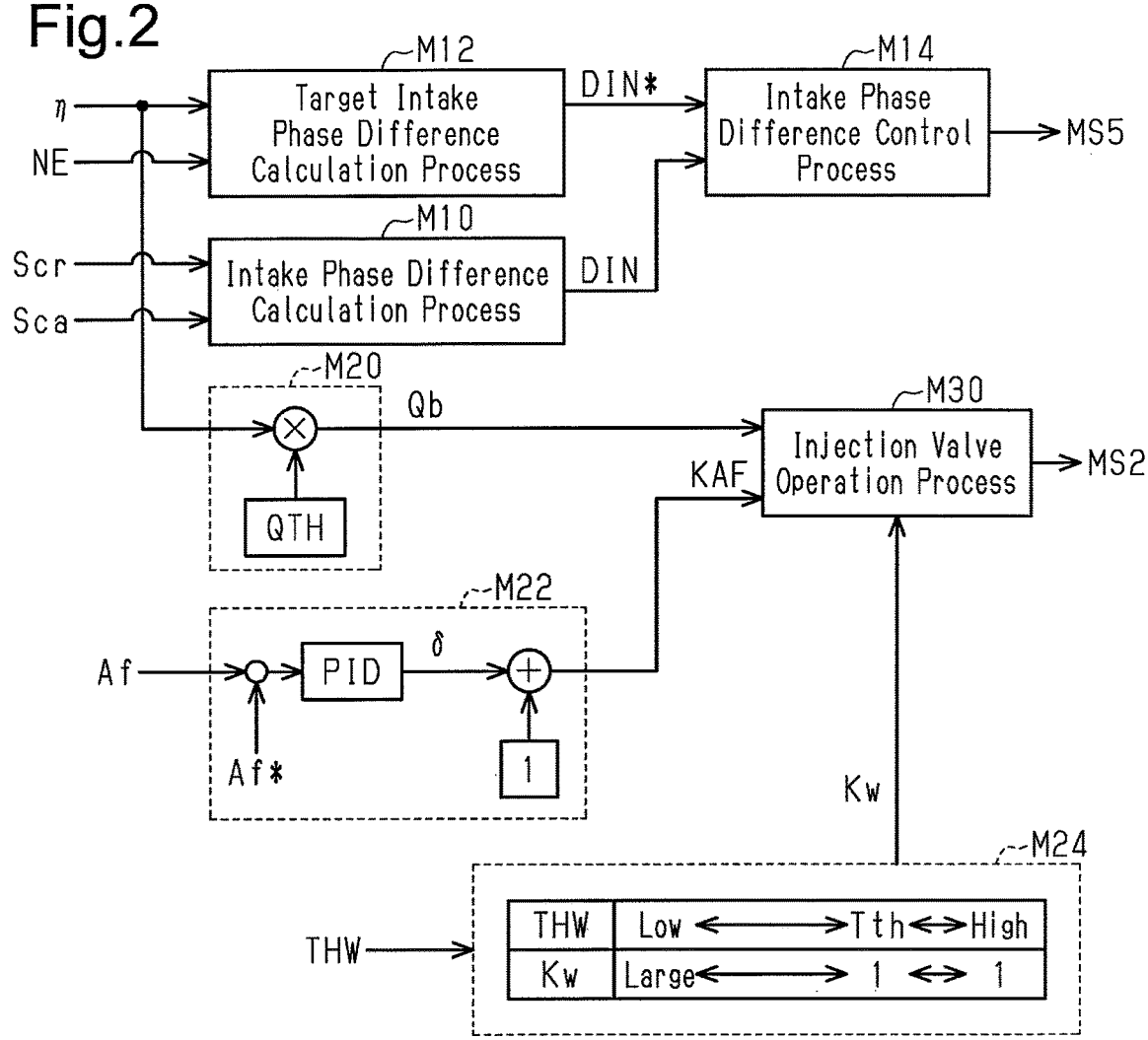
FIG. 2 is a block diagram showing part of processes executed by the control device in the internal combustion engine of FIG. 1.

FIG. 2 shows part of processes executed by control device 50. The processes shown in FIG. 2 are implemented by the CPU 52 executing the programs stored in the ROM 54.

An intake phase difference calculation process M10 is a process for calculating an intake phase difference DIN, which is a phase difference of the rotation angle of the intake camshaft 40 relative to the rotation angle of the crankshaft 28, based on the output signal Scr of the crank angle sensor 60 and the output signal Sca of the intake cam angle sensor 66. A target intake phase difference calculation process M12 is a process for variably setting a target intake phase difference DIN* based on the operating point of the internal combustion engine 10. In the present embodiment, the operation point is defined by a rotation speed NE and a charging efficiency η. The CPU 52 calculates the rotation speed NE based on the output signal Scr of the crank angle sensor 60 and calculates the charging efficiency η based on the rotation speed NE and the intake air amount Ga. The charging efficiency η is a parameter that determines the amount of fresh air filling the combustion chamber 24.

An intake phase difference control process M14 is a process for outputting the operation signal MS5 to the intake valve timing adjustment device 44 in order to operate the intake valve timing adjustment device 44 so that the intake phase difference DIN is controlled to the target intake phase difference DIN*.

A base injection amount calculation process M20 is a process for calculating a base injection amount Qb based on the charging efficiency η. The base injection amount Qb is the base value of a fuel amount for setting the air-fuel ratio of the air-fuel mixture in the combustion chamber 24 to a target air-fuel ratio. More specifically, the base injection amount calculation process M20 simply needs to be a process for calculating the base injection amount Qb by, for example, multiplying a fuel amount QTH per one percent of the charging efficiency η for setting the air-fuel ratio to the target air-fuel ratio when the charging efficiency η is expressed in percentage. The base injection amount Qb is a fuel amount calculated to control the air-fuel ratio to the target air-fuel ratio based on the amount of fresh air filling the combustion chamber 24. The target air-fuel ratio simply needs to be set to, for example, the stoichiometric air-fuel ratio.

A feedback process M22 is a process for calculating and outputting a feedback correction coefficient KAF, which is obtained by adding 1 to a correction ratio δ of the base injection amount Qb. The correction ratio δ of the base injection amount Qb is a feedback operation amount for performing feedback control on the air-fuel ratio Af to a target value Af*. More specifically, the feedback process M22 sets, to the correction ratio δ, the sum of the output values of a proportional element and a differential element in which the difference between the air-fuel ratio Af and the target value Af* is an input and the output value of an integral element that maintains and outputs the integration value of a value corresponding to the difference between the air-fuel ratio Af and the target value AP.

A low-temperature correction process M24 is a process for calculating a low-temperature increase coefficient Kw to be greater than 1 in order to increase the base injection amount Qb when the water temperature THW is less than a predetermined temperature Tth (for example, 60° C.). More specifically, the low-temperature increase coefficient Kw is calculated to be a larger value when the water temperature THW is low than when the water temperature THW is high. When the water temperature THW is greater than or equal to the predetermined temperature Tth, the low-temperature increase coefficient Kw is set to 1 and the correction amount of the base injection amount Qb with the low-temperature increase coefficient Kw is set to 0.

An injection valve operation process M30 is a process for outputting the operation signal MS2 to the port injection valve 16 in order to operate the port injection valve 16. In particular, the injection valve operation process M30 is a process for outputting the operation signal MS2 to the port injection valve 16 based on the base injection amount Qb, the feedback correction coefficient KAF, and the low-temperature increase coefficient Kw when the accuracy of the intake air amount Ga, which is detected by the airflow meter 62, is tolerable. More specifically, the injection valve operation process M40 is a process for causing the port injection valve 16 to inject the requested injection amount Qd, which is the amount of fuel requested to be supplied to a single cylinder in a single combustion cycle from the port injection valve 16. The requested injection amount Qd is KAF·Kw·Qb.

Figure 3:
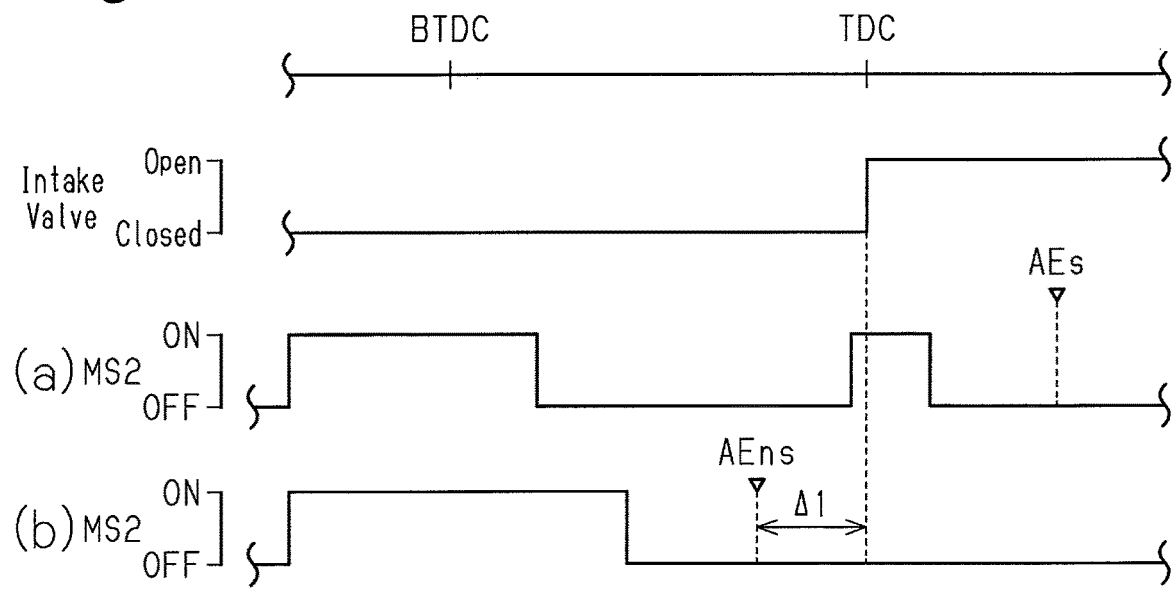
FIG. 3 shows injection patterns in the internal combustion engine of FIG. 1, including section (a) and section (b).

The fuel injection processes of the present embodiment include two types of processes, namely, a process illustrated in section (a) of FIG. 3 and a process illustrated in section (b) of FIG. 3.

Section (a) of FIG. 3 illustrates the intake synchronous injection, which injects fuel in synchronization with the open period of the intake valve 18, and the intake asynchronous injection, which injects fuel at a timing advanced with respect to the timing of the intake synchronous injection. More specifically, the intake synchronous injection is to inject fuel such that the period in which the fuel injected from the port injection valve 16 reaches the position of the intake valve 18 prior to opening is within the open period of the intake valve 18. The position of the intake valve 18 prior to opening is the downstream end of the intake port, that is, an inlet IN of the combustion chamber 24 shown in FIG. 1. FIG. 1 shows a state in which the intake valve 18 is open. The starting point of the fuel-reaching period is the timing at which the fuel injected at the earliest timing in the fuel injected from the port injection valve 16 reaches the position of the intake valve 18 prior to opening. The end point of the fuel-reaching period is the timing the fuel injected at the latest timing in the fuel injected from the port injection valve 16 reaches the position of the intake valve 18 prior to opening. The intake asynchronous injection is to inject fuel such that the fuel injected from the port injection valve 16 reaches the intake valve 18 before the intake valve 18 opens. In other words, in the intake asynchronous injection, the fuel injected from the port injection valve 16 remains in the intake passage 12 until the intake valve 18 opens and flows into the combustion chamber 24 after the intake valve 18 opens. In the present embodiment, in the intake asynchronous injection, fuel is injected such that the period in which the fuel injected from the port injection valve 16 reaches the position of the intake valve 18 prior to opening is within the closed period of the intake valve 18.

Section (b) of FIG. 3 illustrates the single injection process for executing only the intake asynchronous injection.

In the present embodiment, the multiple injection process is executed with the intention of reducing the number (PN) of particulate matter (PM) in exhaust gas. That is, in a case in which the temperature of the intake system of the internal combustion engine 10 such as the intake passage 12 and the intake valve 18 is low to a certain extent, PN tends to increase when the single injection process is executed in a region where the charging efficiency η is high to a certain extent. This may be because the requested injection amount Qd is larger when the charging efficiency η is high than when the charging efficiency η is low and thus the amount of fuel collecting on the intake system increases. More specifically, when the amount of fuel collecting on the intake system increases to a certain extent, shearing the collected fuel presumably causes some of the collected fuel to flow into the combustion chamber 24 in a state in which they remain droplets. Thus, in the present embodiment, some of the requested injection amount Qd is injected using the intake synchronous injection. Thus, even when the requested injection amount Qd is large, injecting some of the requested injection amount Qd reduces the amount of fuel collecting on the intake system considering a large amount of the requested injection amount Qd and consequently reduces PN. During a cold start of the internal combustion engine 10, the injection amount is large regardless of the charging efficiency Thus, PN tends to increase when the single injection process is executed.

Figure 4:
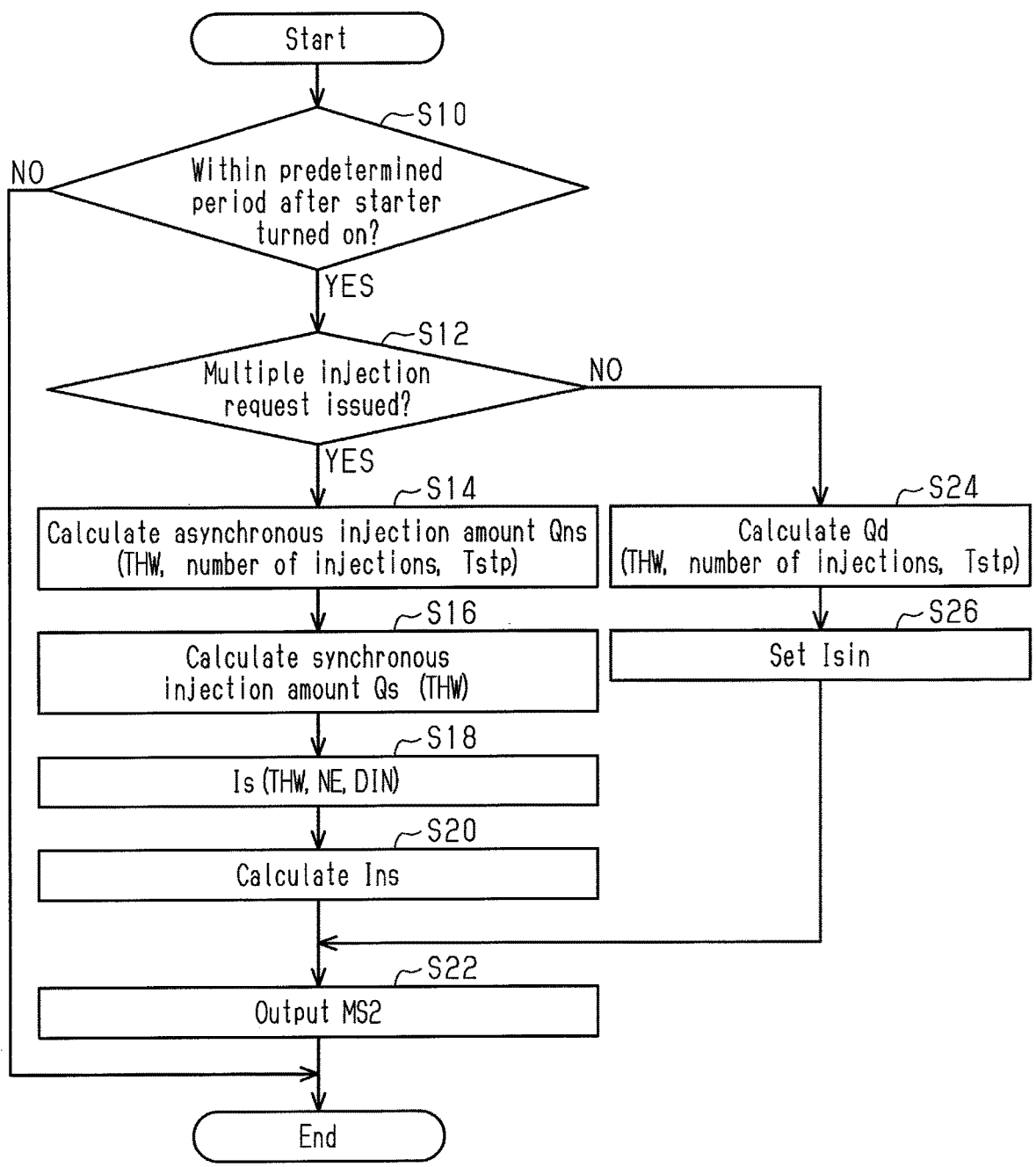
FIG. 4 is a flowchart illustrating a procedure for an injection valve operation process in the internal combustion engine of FIG. 1.

FIG. 4 illustrates a procedure for the injection valve operation process M30. The processes shown in FIG. 4 are executed by the CPU 52 repeatedly executing programs stored in the ROM 54, for example, in a predetermined cycle. In the following description, the number of each step is represented by the letter S followed by a numeral.

In a series of processes illustrated in FIG. 4, the CPU 52 first determines whether the current time is within a predetermined period after the starter motor 36 was started ("after starter turned on" in FIG. 4) (S10). The predetermined period refers to a period in which the amount of air filling the combustion chamber 24 cannot be obtained precisely and thus the base injection amount Qb cannot be calculated precisely. When determining that the current time is within a predetermined period after the starter motor 36 was started (S10: YES), the CPU 52 determines whether a request for the multiple injection process has been issued (S12). When the water temperature THW is less than the predetermined temperature Tth, the CPU 52 determines that the request for the multiple injection process has been issued. When determining that the request for the multiple injection process has been issued (S12: YES), the CPU 52 calculates an asynchronous injection amount Qns, which is an injection amount of the intake asynchronous injection, based on the water temperature THW, the number of injections after the starter was turned on, and a stop time Tstp of the internal combustion engine 10 (S14). The stop time Tstp of the internal combustion engine 10 is the time elapsed from when the internal combustion engine 10 was previously stopped to when the internal combustion engine 10 is currently started. The CPU 52 calculates the asynchronous injection amount Qns to be larger when the water temperature THW is low than when the water temperature THW is high. The CPU 52 calculates the asynchronous injection amount Qns to be larger when the stop time Tstp is long than when the stop time Tstp is short.

Subsequently, the CPU 52 uses the water temperature Thw to calculate a synchronous injection amount Qs, which is an injection amount of the intake synchronous injection (S16). The CPU 52 calculates the synchronous injection amount Qs to be larger when the water temperature THW is low than when the water temperature THW is high.

The sum of the asynchronous injection amount Qns and the synchronous injection amount Qs is the requested injection amount Qd, which is an injection amount requested in a single combustion cycle. That is, the processes of S14 and S16 are processes for splitting the requested injection amount Qd of fuel into the asynchronous injection amount Qns and the synchronous injection amount Qs.

Then, the CPU 52 uses the water temperature THW, the rotation speed NE, and the intake phase difference DIN to calculate an injection start timing Is (crank angle) of the intake synchronous injection (S18). The water temperature THW is a parameter that has a positive correlation with the temperature of the intake system of the internal combustion engine 10. When the water temperature THW differs, the ease of vaporization of fuel collecting on the intake system tends to differ. Thus, a suitable injection start timing Is of the intake synchronous injection for reducing PN depends on the water temperature THW. Further, when the rotation speed NE differs, the flow speed of fluid in the intake passage 12 differs. This differentiates the amount of fuel collecting on and remains in the intake system without flowing into the combustion chamber 24. Furthermore, when the rotation speed NE differs, the rotation amount of the crankshaft 28 differs during a period in which a predetermined amount of fuel vaporizes in the fuel injected from the port injection valve 16. Thus, a suitable injection start timing Is of the intake synchronous injection for reducing PN depends on the rotation speed NE. In addition, when the intake phase difference DIN differs, difference occurs in an overlap amount in which the open period of the intake valve 18 overlaps the open period of the exhaust valve 30. Consequently, difference occurs in the amount of fluid blown back from the combustion chamber 24 to the intake passage 12. When the blowback amount differs, the temperature of the intake system differs. This differentiates the ease of vaporization of fuel in the intake system and the amount of fuel collecting on and remaining in the intake system without flowing into the combustion chamber 24. Thus, a suitable injection start timing Is of the intake synchronous injection for reducing PN depends on the intake phase difference DIN. During the predetermined period after the starter was turned on, the target intake phase difference DIN* cannot be made variable based on the charging efficiency Thus, the target intake phase difference DIN* may be a fixed value. Even in this case, since the position at which the target intake phase difference DIN* is fixed may differ, the injection start timing Is of the intake synchronous injection is calculated based on the intake phase difference DIN. This improves the versatility of the process of S18.

More specifically, the process of S18 is a process for performing map calculation for the injection start timing Is of the intake synchronous injection using the CPU 52 in a state in which the ROM 54 stores in advance map data including the water temperature THW, the rotation speed NE, and the intake phase difference DIN as input variables and including the injection start timing Is of the intake synchronous injection as an output variable. The map data refers to a data set of discrete values of input variables and values of output variables each corresponding to a value of the input variables. When the value of an input variable matches any of the values of the input variable on the map data, the map calculation uses the value of the corresponding output variable on the map data as the calculation result. When the value of the input variable does not match any of the values of the input variable on the map data, the map calculation uses a value obtained by interpolation of multiple values of the output variable included in the map data set as the calculation result.

Next, the CPU 52 calculates an injection start timing Ins (crank angle) of the intake asynchronous injection (S20). The CPU 52 calculates the injection start timing Ins of the intake asynchronous injection such that the time interval between an injection end timing of the intake asynchronous injection and the injection start timing Is of the intake synchronous injection is greater than or equal to a predetermined time. The predetermined time is determined by the structure of the port injection valve 16. In two types of fuel injection chronologically adjacent to each other, the predetermined time is used to prevent the retarded injection from starting before the advanced injection. The CPU 52 operates the port injection valve 16 by outputting the operation signal MS2 to the port injection valve 16 to cause the fuel of the asynchronous injection amount Qns to be injected at the injection start timing Ins and then operates the port injection valve 16 by outputting the operation signal MS2 to the port injection valve 16 to cause the fuel of the synchronous injection amount Qs to be injected at the injection start timing Is of the intake synchronous injection (S22).

When determining that the request for executing the multiple injection process has not been made (S12: NO), the CPU 52 calculates the requested injection amount Qd, which is an injection amount requested in a single combustion cycle, based on the water temperature THW, the number of injections after the starter was turned on, and the stop time Tstp (S24). Subsequently, the CPU 52 calculates an injection start timing Isin (crank angle) of the single injection (S26). Then, the CPU 52 operates the port injection valve 16 by outputting the operation signal MS2 of the port injection valve 16 to cause the fuel of the requested injection amount Qd to be injected at the injection start timing Isin of the single injection (S22).

When completing the process of S22 or when making a negative determination in the process of S10, the CPU 52 temporarily ends the series of processes shown in FIG. 4.

Figure 5:
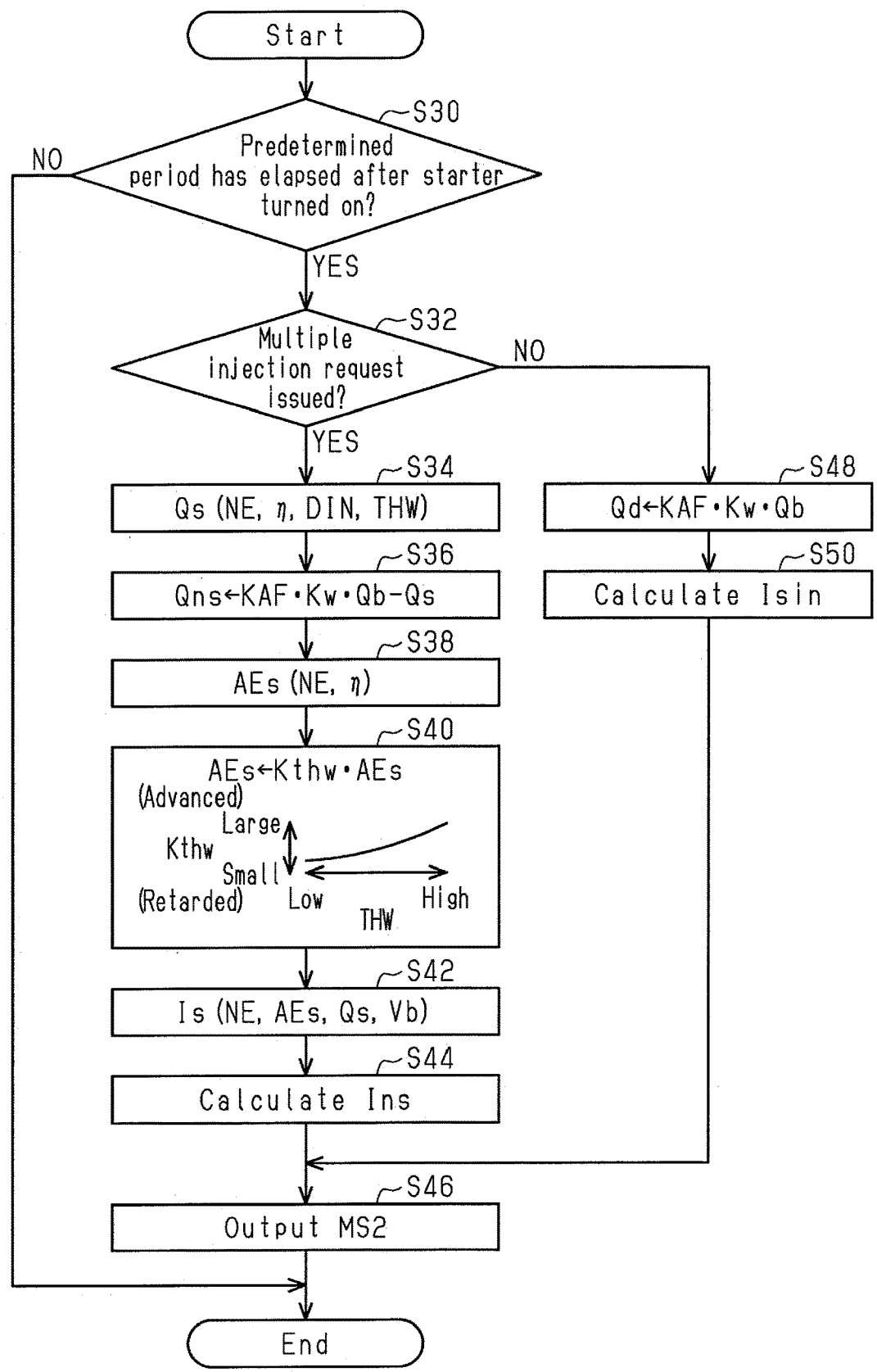
FIG. 5 is a flowchart illustrating a procedure for the injection valve operation process in the internal combustion engine of FIG. 1.

FIG. 5 illustrates a procedure for the injection valve operation process M30. The processes shown in FIG. 5 are executed by the CPU 52 repeatedly executing programs stored in the ROM 54, for example, in a predetermined cycle.

In a series of processes illustrated in FIG. 5, the CPU 52 first determines whether the predetermined period has elapsed since the starter motor 36 was turned on (S30). When determining that the predetermined period has elapsed since the starter motor 36 was turned on (S30: YES), the CPU 52 determines whether the multiple injection request has been issued (S32). The CPU 52 determines that the request for executing the multiple injection process has been issued when the logical conjunction of condition (i), condition (ii), and condition (iii) is true. Condition (i) is that the water temperature THW is less than or equal to a predetermined temperature Tth. Condition (ii) is that the charging efficiency η is greater than or equal to a given value. Condition (iii) is that the rotation speed NE is less than or equal to the predetermined speed NEth. Condition (iii) is used to obtain the time interval between the end timing of the intake asynchronous injection and the start timing of the intake synchronous injection. Further, this condition is that since the multiple injection process produces a larger load than the single injection process, an increase in the calculation load of the control device 50 prevents the heat-generation amount from becoming excessively large.

When determining that the multiple injection request has been issued (S32: YES), the CPU 52 calculates the synchronous injection amount Qs, which is an injection amount of the intake synchronous injection (S34). The CPU 52 calculates the synchronous injection amount Qs in accordance with the rotation speed NE, the charging efficiency the water temperature THW, and the intake phase difference DIN. More specifically, the CPU 52 performs map calculation for the synchronous injection amount Qs in a state in which the ROM 54 stores in advance map data including the rotation speed NE, the charging efficiency η, the water temperature THW, and the intake phase difference DIN as input variables and including the synchronous injection amount Qs as an output variable.

Subsequently, the CPU 52 subtracts the synchronous injection amount Qs from the requested injection amount Qd, which is Qb·KAF·Kw, to calculate the asynchronous injection amount Qns, which is an injection amount of the intake asynchronous injection (S36).

Thus, the sum of the asynchronous injection amount Qns and the synchronous injection amount Qs is equal to the requested injection amount Qd. That is, the processes of S34 and S36 are performed to split the requested injection amount Qd of fuel into the asynchronous injection amount Qns and the synchronous injection amount Qs. The synchronous injection amount Qs is unaffected by the values of the feedback correction coefficient KAF and the low-temperature increase coefficient Kw. The synchronous injection amount Qs is fixed in this manner because the changes in exhaust component ratios that occur when the synchronous injection amount Qs is changed are more noticeable than the changes in exhaust component ratios when the asynchronous injection amount Qns is changed.

Next, the CPU 52 uses the rotation speed NE and the charging efficiency η to calculate a reach end timing AEs, which is shown in section (a) in FIG. 3 (S38). The reach end timing AEs refers to the target value of a timing at which fuel injected at the latest timing in the fuel injected from the port injection valve 16 reaches the position (IN in FIG. 1) in the closed period of the intake valve 18. When the rotation speed NE differs, the flow speed of fluid in the intake passage 12 changes. This differentiates the amount of fuel collecting on and remains in the intake system without flowing into the combustion chamber 24. Further, when the rotation speed NE differs, the rotation amount of the crankshaft 28 differs during a period in which a predetermined amount of fuel vaporizes in the fuel injected from the port injection valve 16. Thus, a suitable reach end timing AEs for reducing PN depends on the rotation speed NE. Furthermore, when the charging efficiency η differs, the base injection amount Qb differs and consequently the amount of fuel collecting on the intake system differs. Additionally, when the charging efficiency η differs, the pressure in the intake passage 12 changes and the ease of atomization of fuel differs. Thus, a suitable reach end timing AEs for reducing PN depends on the charging efficiency η.

Subsequently, the CPU 52 substitutes, into the reach end timing AEs, a value obtained by multiplying the reach end timing AEs calculated in the process of S38 by a water temperature correction coefficient Kthw (S40). The water temperature correction coefficient Kthw is a correction coefficient corresponding to the water temperature THW.

The crank angle to be referenced is located to be more retarded than the most retarded position of the reach end timing AEs that is expected. The reach end timing AEs has a value that increases toward the advanced side with respect to the crank angle to be referenced. The water temperature correction coefficient Kthw is a value greater than zero. More specifically, the CPU 52 corrects the reach end timing AEs to be retarded by calculating the water temperature correction coefficient Kthw to a smaller value when the water temperature THW is low than when the water temperature THW is high. This correction is performed in view of the fact that an optimal timing for reducing PN is shifted to the retarded side because the amount of fuel collecting on and remaining in the intake system without flowing into the combustion chamber 24 is increased because it is more difficult for fuel to be vaporized in the intake system when the water temperature THW is low than when the water temperature THW is high.

The CPU 52 calculates the injection start timing Is of the intake synchronous injection based on the reach end timing AEs obtained in the process of S40, the synchronous injection amount Qs, the rotation speed NE, and the terminal voltage Vb (S42). The CPU 52 calculates the injection start timing Is of the intake synchronous injection to be more advanced when the synchronous injection amount Qs is large than when the synchronous injection amount Qs is small. Further, the CPU 52 calculates the injection start timing Is of the intake synchronous injection to be more advanced when the rotation speed NE is high than when the rotation speed NE is low. More specifically, the CPU 52 sets, as the injection start timing Is of the intake synchronous injection, the timing advanced with respect to the reach end timing AEs by a value obtained by adding an injection period, a travel time, and an invalid injection time of the port injection valve 16, which are determined by the synchronous injection amount Qs. The travel time refers to a required time for the fuel injected from the port injection valve 16 to reach the inlet IN of the combustion chamber 24. In the present embodiment, the travel time is a fixed value. The invalid injection time refers to the time by which fuel injection actually starts after the operation signal MS2, which causes the port injection valve 16 to open, is output. The invalid injection time depends on a drive voltage applied to the port injection valve 16. Thus, in the present embodiment, the CPU 52 calculates the invalid injection time in accordance with the terminal voltage Vb.

Next, the CPU 52 calculates the injection start timing Ins of the asynchronous injection based on the injection start timing Is of the intake synchronous injection (S44). The calculation is performed such that the time interval between the injection end timing of the intake asynchronous injection and the injection start timing Is of the intake synchronous injection is greater than or equal to the above-described predetermined time.

The above-described process is performed to set the injection start timing Is of the intake synchronous injection independently from the injection start timing Ins of the intake asynchronous injection. This is because the reach end timing AEs of the intake synchronous injection is easily affected in particular by PN and HC in exhaust gas.

The CPU 52 operates the port injection valve 16 by outputting the operation signal MS2 to the port injection valve 16 to cause the fuel of the asynchronous injection amount Qns to be injected at the injection start timing Ins and then to cause the fuel of the synchronous injection amount Qs to be injected at the injection start timing Is of the intake synchronous injection (S46).

When determining that the request for the multiple injection process has not been made (S32: NO), the CPU 52 substitutes KAF·Kw·Qb into the requested injection amount Qd (S48). Next, the CPU 52 calculates the injection start timing Isin of the single injection (S50). More specifically, as shown in section (b) of FIG. 3, the CPU 52 sets, as a reach end timing AEns, the timing advanced by a predetermined amount Δ1 with respect to the timing at which the intake valve 18 starts opening. Subsequently, the CPU 52 sets, as the injection start timing Isin of the single injection, the timing advanced with respect to the reach end timing AEs by a value obtained by adding the injection period, the travel time, and the invalid injection time of the port injection valve 16, which are determined by the requested injection amount Qd. Referring back to FIG. 5, the CPU 52 operates the port injection valve 16 by outputting the operation signal MS2 of the port injection valve 16 to cause the fuel of the requested injection amount Qd to be injected at the injection start timing Isin of the single injection (S46).

When completing the process of S46 or when making a negative determination in the process of S30, the CPU 52 temporarily ends the series of processes shown in FIG. 5.

The operation and advantage of the present embodiment will now be described.

During the predetermined period after the starter was turned on, the CPU 52 variably sets the injection start timing Is of the intake synchronous injection based on the water temperature THW, the rotation speed NE, and the intake phase difference DIN. After the predetermined period has elapsed since the starter was turned on, the CPU 52 variably sets the injection start timing Is of the intake synchronous injection based on the rotation speed NE, the charging efficiency and the water temperature THW. Thus, as compared to when, for example, the injection start timing Is of the intake synchronous injection is fixed, adaptation to an optimal timing for reducing PN can be performed. This reduces PN.

The above-described present embodiment further provides the following advantages.

(1) After the predetermined period has elapsed since the starter was turned on, the CPU 52 sets the injection start timing Is of the intake synchronous injection based on the reach end timing AEs. The inventor has found out that a suitable timing for reducing PN is determined by a timing at which the fuel injected from the port injection valve 16 at the latest timing reaches the inlet IN of the combustion chamber 24. The injection start timing Is of the intake synchronous injection is not unambiguously determined by the timing for the fuel to reach the inlet IN and depends on, for example, the injection start timing Is of the intake synchronous injection. The synchronous injection amount Qs is calculated in accordance with the rotation speed NE, the water temperature THW, the charging efficiency and the intake phase difference DIN. If the injection start timing Is of the intake synchronous injection is directly calculated without calculating the reach end timing AEs, highly-dimensional adaptation including at least all the parameters used to calculate the synchronous injection amount Qs is needed. This increases the number of adaptation steps. In the present embodiment, the reach end timing AEs is used. Thus, in the present embodiment, the adaptation of the relationship of the reach end timing AEs and two-dimensional parameters (rotation speed NE and charging efficiency η) and the adaptation of the relationship of the water temperature correction coefficient Kthw and one-dimensional parameter (water temperature THW) only need to be performed. This reduces the number of adaptation steps.

Second Embodiment

A second embodiment will now be described with reference to FIGS. 6A to 7. The differences from the first embodiment will mainly be discussed.

Figure 6A:
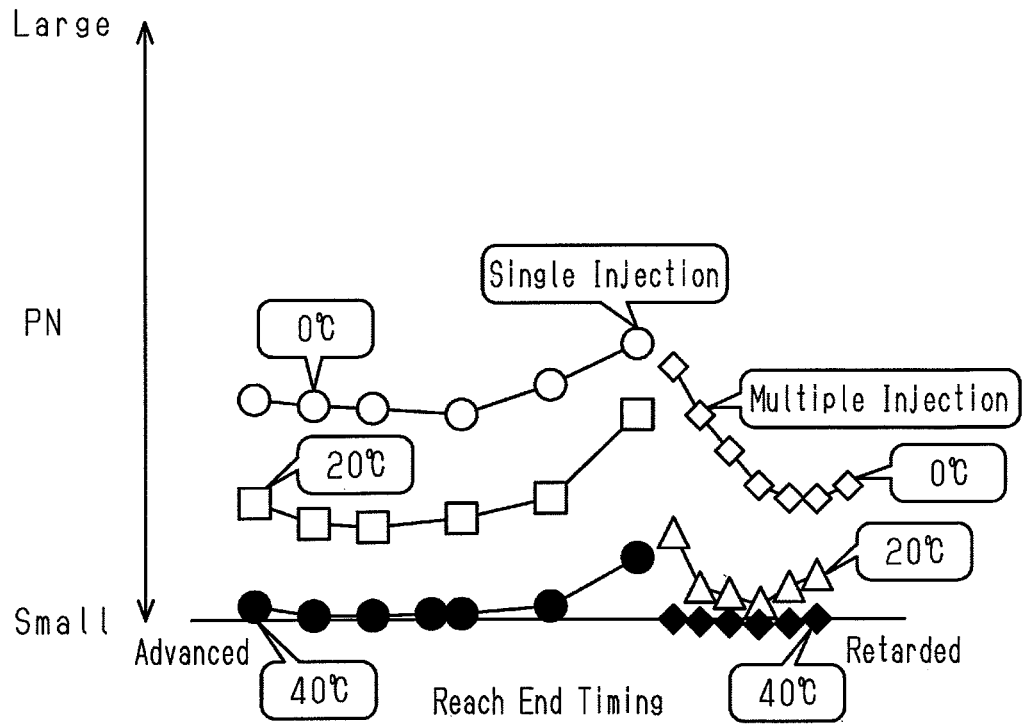
FIG. 6A is a graph showing variation in the emission amount of PN at an open timing of the intake valve.
Figure 6B:
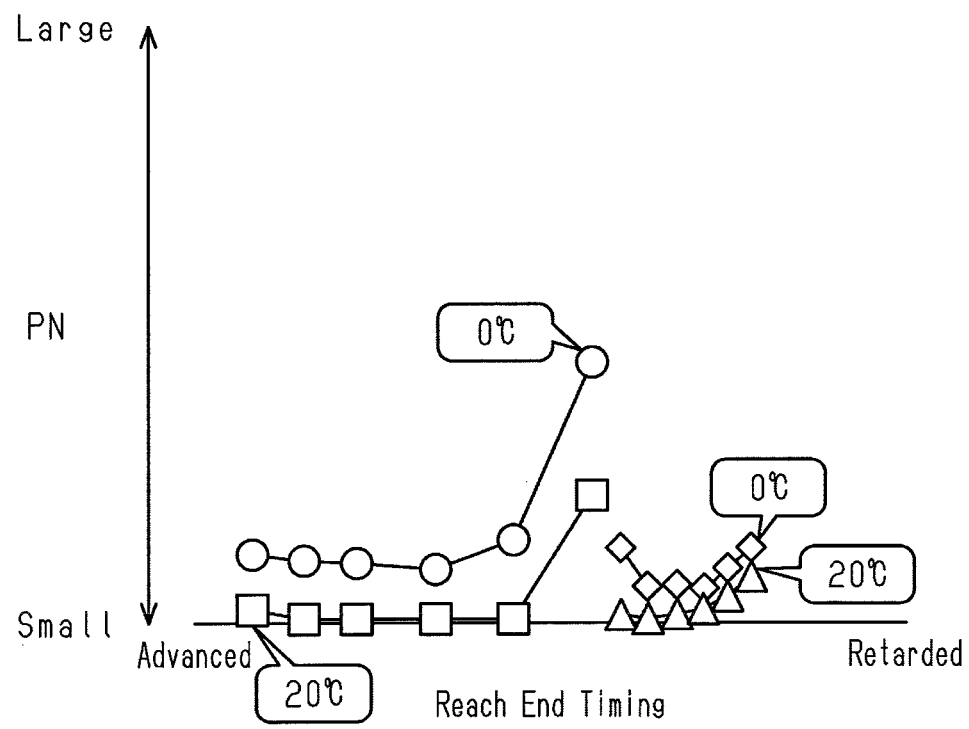
FIG. 6B is a graph showing variation in the emission amount of PN at the open timing of the intake valve.

FIGS. 6A and 6B both show the relationship between the reach end timing with PN and HC. More specifically, FIG. 6A shows a case in which the overlap amount is zero, and FIG. 6B shows a case in which the overlap amount is set to be greater than zero by advancing the opening start timing of the intake valve 18.

As shown in FIGS. 6A and 6B, when the overlap amount is increased by advancing the intake valve 18, an optimal reach end timing for reducing PN shifts to the advanced side. This is presumably because during a period in which the intake valve 18 and the exhaust valve 30 are both open, when fluid in the combustion chamber 24 is blown back to the intake passage 12, the intake system is heated to facilitate the vaporization of fuel in the intake system. Also, this is presumably because a decrease occurs in the amount of fuel collecting on and remains in the intake system without flowing into the combustion chamber 24.

Thus, in the present embodiment, instead of directly adapting the retardation amount ΔAEs, a retardation amount ΔAEs of the reach end timing AEs with respect to the opening start timing of the intake valve 18 is adapted. Accordingly, as the intake phase difference DIN becomes advanced, the reach end timing AEs becomes advanced.

FIG. 6A shows cases in which the water temperatures THW are 0°, 20°, and 40°, and FIG. 6B shows cases in which the water temperatures THW are 0° and 20°. FIGS.

6A and 6B indicate that when the water temperature THW is low, PN can be reduced by further retarding the reach end timing AEs. Such a tendency matches the setting of the water temperature correction coefficient Kthw in the process of S40 of FIG. 5.

Figure 7:
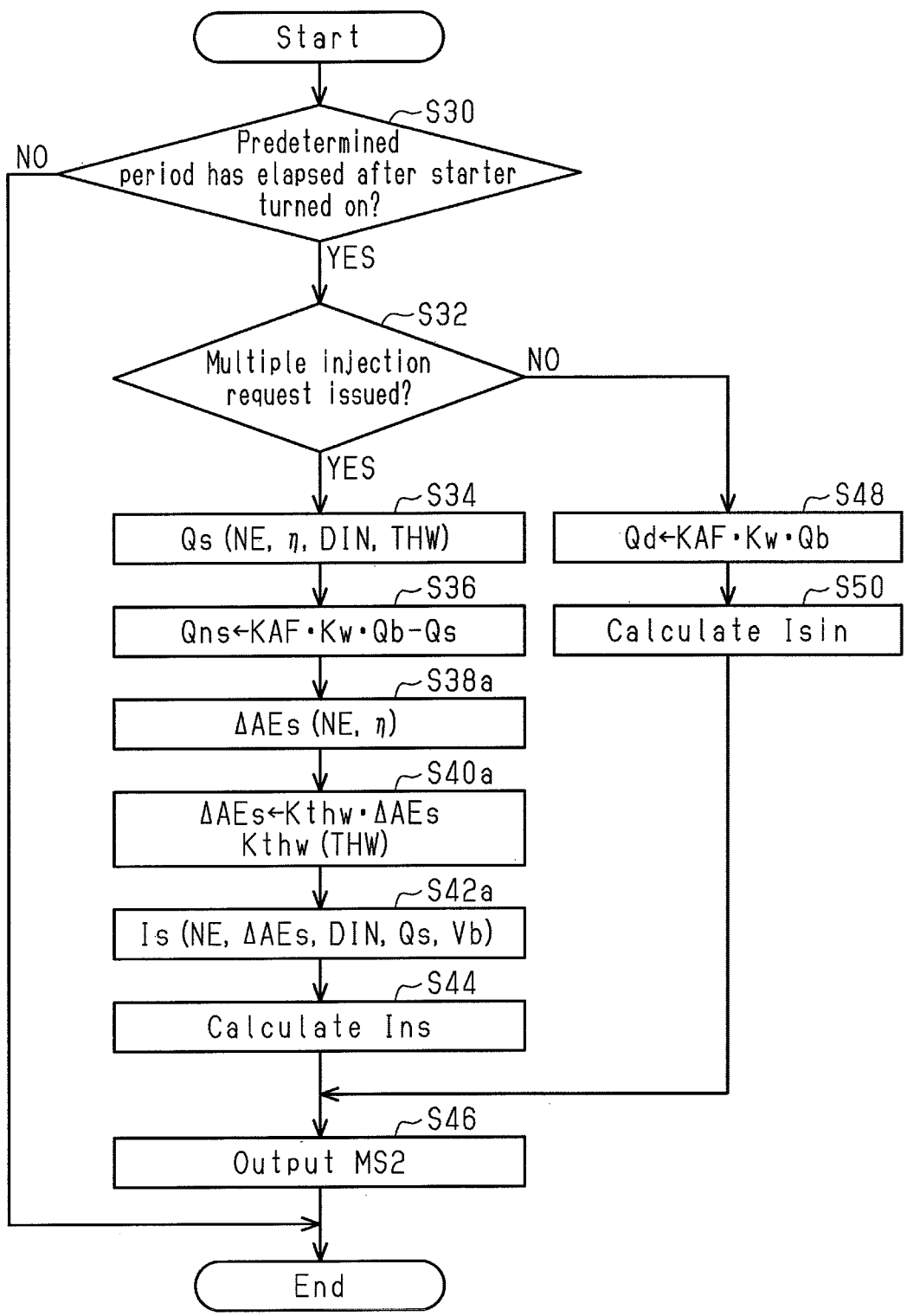
FIG. 7 is a flowchart illustrating a procedure for an injection valve operation process according to a second embodiment of the present disclosure.

FIG. 7 illustrates a procedure for the injection valve operation process M30 according to the present embodiment. The processes shown in FIG. 7 are executed by the CPU 52 repeatedly executing programs stored in the ROM 54, for example, in a predetermined cycle. In FIG. 7, the same step numbers are given to the processes that correspond to those in FIG. 5.

In a series of processes shown in FIG. 7, after completing the process of S36, the CPU 52 calculates the retardation amount ΔAEs based on the rotation speed NE and the charging efficiency η (S38a). Next, the CPU 52 substitutes, into the retardation amount ΔAEs, a value obtained by multiplying the water temperature correction coefficient Kthw by the retardation amount ΔAEs calculated in S38a (S40a). The reach end timing AEs is retarded by the retardation amount ΔAEs with respect to the opening start timing of the intake valve 18 determined by the intake phase difference DIN. The CPU 52 sets the injection start timing Is of the intake synchronous injection to a timing advanced with respect to the retardation amount ΔAEs by a value obtained by adding the injection time, the travel time, and the invalid injection time of the port injection valve 16 determined by the synchronous injection amount Qs (S42). Then, the CPU 52 proceeds to the process of S44.

In this manner, in the present embodiment, the reach end timing AEs is determined by the retardation amount ΔAEs. Thus, as the opening start timing of the intake valve 18 becomes advanced, the reach end timing AEs becomes more advanced. The tendency indicated in FIGS. 6A and 6B is reflected on such a process.

For example, when the intake phase difference DIN is determined by the rotation speed NE and the charging efficiency the reach end timing AEs is determined in accordance with the rotation speed NE and the charging efficiency η like in the first embodiment. Accordingly, as the intake phase difference DIN becomes advanced, the reach end timing AEs is adapted to be advanced. However, even if the same internal combustion engine 10 is used, the setting of the intake phase differences DIN in correspondence with the rotation speed NE and the charging efficiency η may differ depending on the vehicle model. When the reach end timing AEs is readapted only due to a change in the setting in such a case, the number of adaptation steps increases. In the present embodiment, the retardation amount ΔAEs is adapted. Thus, even when there is difference in the setting of the intake phase differences DIN in correspondence with the rotation speed NE and the charging efficiency the retardation amount ΔAEs can be shared between the intake phase differences DIN having different settings.

Third Embodiment

A third embodiment will now be described with reference to FIG. 8. The differences from the first embodiment will mainly be discussed.

Figure 8:
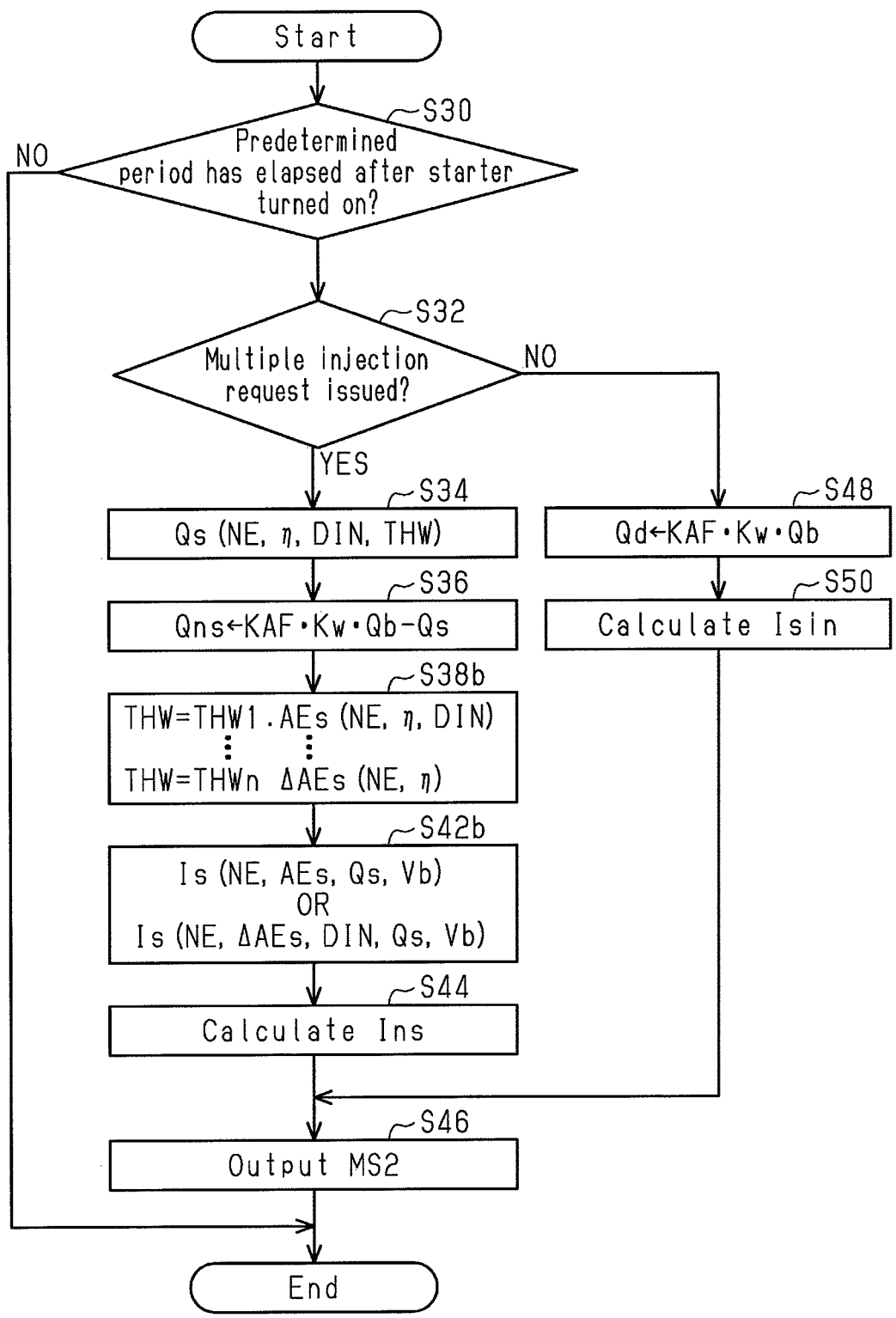
FIG. 8 is a flowchart illustrating a procedure for an injection valve operation process according to a third embodiment of the present disclosure.

FIG. 8 illustrates a procedure for the injection valve operation process M30 according to the present embodiment. The processes shown in FIG. 8 are executed by the CPU 52 repeatedly executing programs stored in the ROM 54, for example, in a predetermined cycle. In FIG. 8, the same step numbers are given to the processes that correspond to those in FIG. 5.

In a series of processes shown in FIG. 8, when completing the process of S36, the CPU 52 selectively executes any one of the following processes in accordance with the value of the water temperature THW (THW1, . . . THWn in FIG. 8) (S38b). A first process is a process for performing map calculation for the reach end timing AEs based on map data that includes the rotation speed NE, the charging efficiency η, and the intake phase difference DIN as input variables and includes the reach end timing AEs as an output variable. A second process is a process for performing map calculation for the retardation amount ΔAEs based on map data that includes the rotation speed NE and the charging efficiency η as input variables and includes the retardation amount ΔAEs as an output variable. The first process is executed in a water-temperature region where an optimal reach end timing AEs for reducing PN may not necessarily be able to be obtained by advancing the reach end timing AEs in proportion to the advancement amount of the opening start timing of the intake valve 18.

Next, the CPU 52 executes a process corresponding to the process of S42a in FIG. 7 or the process of S42 in FIG. 5 in accordance with whether the retardation amount ΔAEs or the reach end timing AEs has been calculated in the process of S38b (S42b). When completing the process of S42b, the CPU 52 proceeds to the process of S44.

In this manner, in the present embodiment, the adapted value of the reach end timing AEs corresponding to the rotation speed NE, the charging efficiency and the intake phase difference DIN are used in the water-temperature region where optimization is difficult in terms of reducing PN by determining the reach end timing AEs in proportion to the advancement amount of the opening start timing of the intake valve 18. This further reduces PN while limiting an increase in the number of adaptation processes. Additionally, the reach end timing AEs is set based on the intake phase difference DIN. Thus, a suitable value for reducing PN can be gained even when the intake phase difference DIN is not set to a value corresponding to the rotation speed NE and the charging efficiency η and exceptionally set to be more retarded in a case in which, for example, the water temperature THW is low.

Correspondence

The correspondence between the items in the above embodiments and the items described in the above-described SUMMARY is as follows. In the following description, the correspondence is shown for each of the numbers in the examples described in the SUMMARY.

[1], [2] The multiple injection process corresponds to the process of S22 subsequent to the process of S20 in FIG. 4 and the process of S46 subsequent to the process of S44 in FIG. 5.

The variably setting process corresponds to the process of S18 in FIG. 4, the processes of S38 to S42 in FIG. 5, the processes of S38a to S42a in FIG. 7, and the processes of S38b and S42b in FIG. 8.

[2] The requested injection amount calculation process corresponds to the base injection amount calculation process M20, the feedback process M22, and the low-temperature correction process M24. That is, since the requested injection amount Qd is Qb·KAF·Kw, the requested injection amount Qd is calculated by calculating the base injection amount Qb, the feedback correction coefficient KAF, and the low-temperature increase coefficient Kw using the above-described processes.

[3], [5], [6] The end timing setting process corresponds to the processes of S38 and S40 in FIG. 5, the processes of S38a and S40a in FIG. 7, and the process of S38b in FIG.

8. That is, the reach end timing is a timing retarded by the retardation amount ΔAEs with respect to the opening start timing of the intake valve 18 determined by the intake phase difference DIN. Thus, at the timing retarded by the retardation amount ΔAEs with respect to the opening start timing of the intake valve 18, the intake phase difference DIN is referenced in the processes of S42*a* and S42*b*.

The start timing calculation process corresponds to the process of S42 in FIG. 5, the process of S42*a* in FIG. 7, and the process of S42*b* in FIG. 8.

[4], [7] The valve actuation variable device corresponds to the intake valve timing adjustment device 44, and the valve actuation controlling process corresponds to the target intake phase difference calculation process M12 and the intake phase difference control process M14. The retardation amount calculation process corresponds to the processes of S38*a* and S38*b*.

Modifications

The above-described embodiments may be modified as follows. The above-described embodiment and the following modifications may be implemented in combination with each other as long as technical contradiction does not occur.

Start Timing Calculation Process

In the above-described embodiments, the injection start timing Is of the intake synchronous injection is calculated taking the invalid injection time depending on the terminal voltage Vb into account. Instead, for example, the invalid injection time may be a fixed value.

End Timing Calculation Process

In FIG. 7, map calculation is performed for the retardation amount ΔAEs using the map data that includes the rotation speed NE and the charging efficiency η as input variables and the retardation amount ΔAEs as an output variable, and the retardation amount ΔAEs is corrected based on the water temperature THW. Instead, map calculation may be performed using map data that includes the rotation speed NE, the charging efficiency η, and the water temperature THW as input variables and includes the retardation amount ΔAEs as an output variable.

In FIG. 8, only when the water temperature THW is included in a predetermined temperature region, map calculation is performed for the reach end timing AEs using the map data that includes the rotation speed NE, the charging efficiency η, and the intake phase difference DIN as input variables and the reach end timing AEs as an output variable. Instead, regardless of the water temperature THW, map calculation may be performed for the reach end timing AEs using map data that includes the rotation speed NE, the charging efficiency η, and the intake phase difference DIN as input variables and the reach end timing AEs as an output variable, and the reach end timing AEs may be corrected in accordance with the water temperature THW. As another option, map calculation may be performed for the reach end timing AEs using map data that includes the rotation speed NE, the charging efficiency the intake phase difference DIN, and the water temperature THW as input variables and the reach end timing AEs as an output variable.

Variably Setting Process (a) Within Predetermined Period After Starter Turned On In FIG. 4, map calculation is performed for the injection start timing based on the map data that includes the rotation speed NE, the water temperature THW, and the intake phase difference DIN as input variables and the injection start timing as an output variable. Instead, map calculation may be performed for the injection start timing based on map data that includes the rotation speed NE and the intake phase difference DIN as input variables and the injection start timing as an output variable, and the injection start timing may be corrected based on the water temperature THW. As another option, the injection start timing may be calculated based only on the rotation speed NE and the water temperature THW regardless of the intake phase difference DIN, based on the rotation speed NE and the intake phase difference DIN regardless of the water temperature THW, or based on the water temperature THW and the intake phase difference DIN regardless of the rotation speed NE. The target intake phase difference DIN* may be used instead of the intake phase difference DIN.

(b) After Predetermined Period Elapsed Since Starter Turned On

In the above-described embodiment, the reach end timing AEs is set based on the rotation speed NE, the charging efficiency and the water temperature THW. Instead, for example, the base injection amount Qb may be used instead of the charging efficiency η as a parameter that indicates the amount of fresh air filling the combustion chamber 24 (parameter indicating load). Alternatively, the reach end timing AEs may be variably set based only on two or three of the four parameters, namely, the rotation speed NE, the load, the water temperature THW, and the intake phase difference DIN.

The injection start timing Is of the intake synchronous injection does not have to be calculated after calculating the reach end timing AEs and the retardation amount ΔAEs. For example, the injection start timing Is of the intake synchronous injection may be calculated based on map data that includes the rotation speed NE and the charging efficiency η as input variables and the injection start timing Is of the intake synchronous injection as an output variable. In this case, the calculated injection start timing Is of the intake synchronous injection may be corrected in accordance with the water temperature THW. Alternatively, for example, the injection start timing Is of the intake synchronous injection may be calculated based on map data that includes the rotation speed NE, the charging efficiency η, and the intake phase difference DIN as input variables and the injection start timing Is of the intake synchronous injection as an output variable. In this case, the calculated injection start timing Is of the intake synchronous injection may be corrected in accordance with the water temperature THW. As another option, for example, the injection start timing Is of the intake synchronous injection may be calculated based on map data that includes the rotation speed NE, the charging efficiency η, the intake phase difference DIN, and the water temperature THW as input variables and the injection start timing Is of the intake synchronous injection as an output variable.

The target intake phase difference DIN* may be used instead of the intake phase difference DIN. Further, the calculated injection start timing Is of the intake synchronous injection may be corrected in accordance with the terminal voltage Vb.

Temperature of Intake System

In the above-described configuration, the water temperature THW is used as the temperature of the intake system. Instead, for example, the temperature of lubricant for the internal combustion engine 10 may be used.

Requested Injection Amount

The requested injection amount Qd may be obtained by correcting the base injection amount Qb with a learning value LAF in addition to the low-temperature increase coefficient Kw and the feedback correction coefficient KAF. The process for calculating the learning value LAF is a process for updating the learning value LAF so as to reduce the correction factor of the base injection amount Qb using the feedback correction coefficient KAF as an input. It is desired that the learning value LAF be stored in an electrically rewritable non-volatile memory.

Further, for example, feedforward control based on the ratio of a disturbing fuel may be used to calculate the requested injection amount Qd such that the requested injection amount Qd is smaller when the disturbing fuel ratio is large than when the disturbing fuel ratio is small. The disturbing fuel ratio is the ratio of the amount of fuel (disturbing fuel) flowing into the combustion chamber 24 of the internal combustion engine 10 other than the fuel injected from the port injection valve 16 in a single combustion cycle to the total amount of fuel flowing into the combustion chamber 24. For example, when the internal combustion engine includes a canister that captures fuel vapor from a fuel tank storing fuel to be injected from the port injection valve 16 and includes an adjustment device that adjusts the amount of fluid in the canister flowing into the intake passage 12, the above-described disturbing fuel includes fuel vapor flowing from the canister to the intake passage 12. Additionally, for example, when the internal combustion engine includes a system that returns fuel vapor in the crankcase to the intake passage 12, the disturbing fuel includes fuel vapor flowing from the crankcase into the intake passage 12.

Intake Asynchronous Injection

In the above-described embodiment, the intake asynchronous injection is to inject fuel such that the period in which the fuel injected from the port injection valve 16 reaches the position of the intake valve 18 prior to opening is within the closed period of the intake valve 18. Instead, when the rotation speed NE is high and the asynchronous injection amount Qns is excessively large, part of the period in which the fuel injected from the port injection valve 16 reaches the position of the intake valve 18 prior to opening may overlap the open period of the intake valve 18.

Single Injection Process

In the above-described embodiment, the single injection process is a process for injecting fuel such that the period in which the fuel injected from the port injection valve 16 reaches the position of the intake valve 18 prior to opening is within the closed period of the intake valve 18. Instead, when the requested injection amount Qd is large, part of the period in which the fuel injected from the port injection valve 16 reaches the position of the intake valve 18 prior to opening may overlap the open period of the intake valve 18. The single injection process does not have to be executed.

Splitting of Requested Injection Amount

In the above-described embodiment, the synchronous injection amount Qs is variably set based on the rotation speed NE, the charging efficiency η, the water temperature THW, and the intake phase difference DIN. Instead, for example, the base injection amount Qb may be used instead of the charging efficiency η as a load parameter that indicates the amount of fresh air filling the combustion chamber 24. Further, the synchronous injection amount Qs may be variably set based on only three, two, or one of the four parameters, namely, the load parameter, the rotation speed NE, the water temperature THW, and the intake phase difference DIN. It is desired that the synchronous injection amount Qs be variably set using at least one of the load parameter and the water temperature THW as much as possible. Alternatively, other than the four parameters, the intake pressure and the flow speed of intake air may be used. The four parameters allow the intake pressure and the flow speed of intake air to be obtained.

The synchronous injection amount Qs does not have to be calculated. Instead, for example, the synchronous injection ratio Ks, which is the ratio of the synchronous injection amount Qs to the base injection amount Qb, may be determined in accordance with the load or the like. Further, the synchronous injection amount Qs may be, for example, a value obtained by splitting, using the synchronous injection ratio Ks, the value (KAF·Qb) obtained by correcting the base injection amount Qb by the feedback correction coefficient KAF. In this case, the synchronous injection amount Qs is Ks·KAF·Qb.

Valve Actuation Controlling Process

In the above-described embodiment, the target intake phase difference DIN* is variably set in accordance with the rotation speed NE and the charging efficiency Instead, as described in the third embodiment, for example, when the water temperature THW is low, an actual timing may exceptionally be limited to be retarded with respect to the open timing of the intake valve 18 that is determined in accordance with the rotation speed NE and the charging efficiency η.

Actuation Varying Device for Intake Valve

The actuation varying device that changes the actuation of the intake valve 18 is not limited to the intake valve timing adjustment device 44. For example, the actuation varying device may be a device that changes a lift amount. In this case, the parameter indicating the valve actuation of the intake valve 18 is the lift amount or the like instead of the intake phase difference DIN.

Control Device

The control device is not limited to a device that includes the CPU 52 and the ROM 54 and executes software processing. For example, at least part of the processes executed by the software in the above-illustrated embodiment may be executed by hardware circuits dedicated to executing these processes (such as ASIC). That is, the control device may be modified as long as it has any one of the following configurations (a) to (c). (a) A configuration including a processor that executes all of the above-described processes according to programs and a program storage device such as a ROM (including a non-transitory computer readable medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Others

The internal combustion engine 10 does not need to include the actuation varying device that changes the actuation of the intake valve 18. The internal combustion engine 10 does not need to include the throttle valve 14.

When the vehicle equipped with the internal combustion engine 10 includes an electric rotating machine as a prime mover that generates the thrust of the vehicle, the rotating machine may be used instead of the starter motor 36 as a means for giving initial rotation to the crankshaft 28.

Fourth Embodiment

A control device for an internal combustion engine according to a fourth embodiment of the present disclosure will now be described with reference to FIGS. 9 to 14B.

Figure 9:
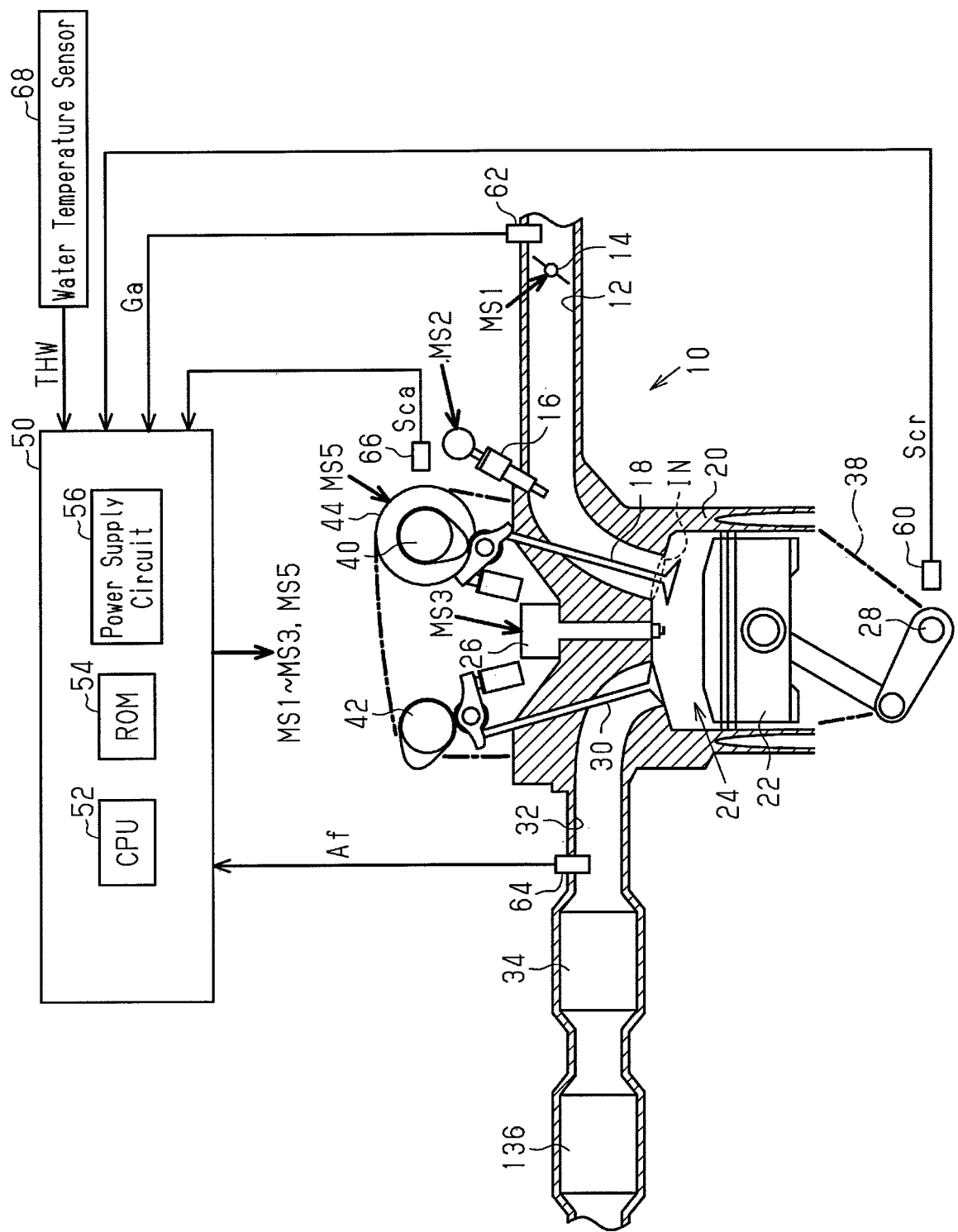
FIG. 9 is a diagram showing a control device and an internal combustion engine according to a fourth embodiment of the present disclosure.

FIG. 9 shows the internal combustion engine 10 installed in the vehicle. The intake passage 12 of the internal combustion engine 10 includes, sequentially from the upstream side, the throttle valve 14 and the port injection valve 16. The air drawn into the intake passage 12 and the fuel injected from the port injection valve 16 flow into the combustion chamber 24, which is defined by the cylinder 20 and the piston 22, as the intake valve 18 opens. The air-fuel mixture of fuel and air drawn into the combustion chamber 24 is burned by the spark discharge of the ignition device 26. The energy generated through the combustion is converted into rotation energy of the crankshaft 28 by the piston 22. The burned air-fuel mixture is discharged to the exhaust passage 32 as exhaust gas when the exhaust valve 30 opens. The exhaust passage 32 includes the catalyst 34. Further, a filter (GPF 136) that captures particulate matter (PM) in exhaust gas is arranged at the downstream side of the catalyst 34 in the exhaust passage 32.

The rotation power of the crankshaft 28 is transmitted through the timing chain 38 to the intake camshaft 40 and the exhaust camshaft 42. In the present embodiment, the power of the timing chain 38 is transmitted to the intake camshaft 40 through the intake valve timing adjustment device 44. The intake valve timing adjustment device 44 is an actuator that adjusts the valve-opening timing of the intake valve 18 by adjusting a rotation phase difference between the crankshaft 28 and the intake camshaft 40.

The control device 50 controls the internal combustion engine 10. In order to control the control amount (for example, torque or exhaust component ratio) of the internal combustion engine 10, the control device 50 operates operation units of the internal combustion engine 10 such as the throttle valve 14, the port injection valve 16, the ignition device 26, and the intake valve timing adjustment device 44. The control device 50 refers to the output signal Scr of the crank angle sensor 60, the intake air amount Ga, which is detected by the airflow meter 62, the air-fuel ratio Af, which is detected by the air-fuel ratio sensor 64, the output signal Sca of the intake cam angle sensor 66, the temperature of coolant (water temperature THW) of the internal combustion engine 10, which is detected by the water temperature sensor 68. FIG. 9 shows the operation signals MS1 to MS3 and MS5, which are respectively used to operate the throttle valve 14, the port injection valve 16, the ignition device 26, and the intake valve timing adjustment device 44.

The control device 50 includes the CPU 52, the ROM 54, and the power supply circuit 56 and controls the above-described control amount by the CPU 52 executing programs stored in the ROM 54. The power supply circuit 56 supplies power to each part in the control device 50.

Figure 10:
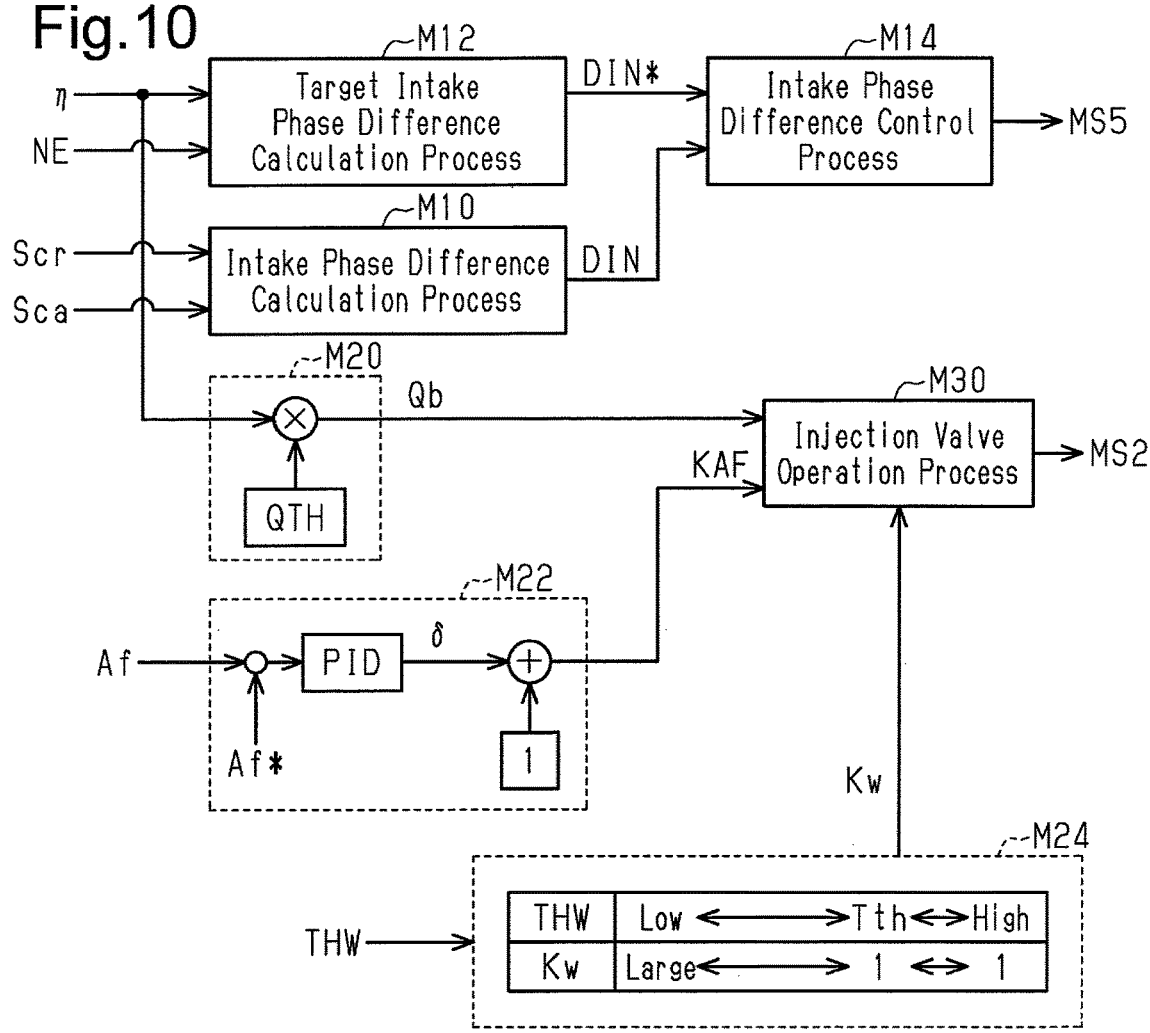
FIG. 10 is a block diagram showing part of processes executed by the control device in the internal combustion engine of FIG. 9.

FIG. 10 shows part of processes executed by control device 50. The processes shown in FIG. 10 are implemented by the CPU 52 executing the programs stored in the ROM 54.

The intake phase difference calculation process M10 is a process for calculating the intake phase difference DIN, which is a phase difference of the rotation angle of the intake camshaft 40 relative to the rotation angle of the crankshaft 28, based on the output signal Scr of the crank angle sensor 60 and the output signal Sca of the intake cam angle sensor 66. The target intake phase difference calculation process M12 is a process for variably setting the target intake phase difference DIN* based on the operating point of the internal combustion engine 10. In the present embodiment, the operation point is defined by a rotation speed NE and a charging efficiency $\eta$. The CPU 52 calculates the rotation speed NE based on the output signal Scr of the crank angle sensor 60 and calculates the charging efficiency $\eta$ based on the rotation speed NE and the intake air amount Ga. The charging efficiency $\eta$ is a parameter that determines the amount of air filling the combustion chamber 24.

The intake phase difference control process M14 is a process for outputting the operation signal MS5 to the intake valve timing adjustment device 44 in order to operate the intake valve timing adjustment device 44 so that the intake phase difference DIN is controlled to the target intake phase difference DIN*.

The base injection amount calculation process M20 is a process for calculating the base injection amount Qb, which is the base value of a fuel amount for setting the air-fuel ratio of the air-fuel mixture in the combustion chamber 24 to the target air-fuel ratio based on the charging efficiency $\eta$. More specifically, the base injection amount calculation process M20 simply needs to be a process for calculating the base injection amount Qb by, for example, multiplying a fuel amount QTH per one percent of the charging efficiency $\eta$ for setting the air-fuel ratio to the target air-fuel ratio when the charging efficiency $\eta$ is expressed in percentage. The base injection amount Qb is a fuel amount calculated to control the air-fuel ratio to the target air-fuel ratio based on the amount of air filling the combustion chamber 24. The target air-fuel ratio simply needs to be set to, for example, the stoichiometric air-fuel ratio.

The feedback process M22 is a process for calculating and outputting the feedback correction coefficient KAF, which is obtained by adding 1 to the correction ratio $\delta$ of the base injection amount Qb, which is a feedback operation amount. The correction ratio $\delta$ of the base injection amount Qb is an operation amount for performing feedback control on the air-fuel ratio Af to the target value Af*. More specifically, the feedback process M22 sets, to the correction ratio $\delta$, the sum of the output values of a proportional element and a differential element in which the difference between the air-fuel ratio Af and the target value Af* is an input and the output value of an integral element that maintains and outputs the integration value of a value corresponding to the difference between the air-fuel ratio Af and the target value Af*.

The low-temperature correction process M24 is a process for calculating the low-temperature increase coefficient Kw to be greater than 1 in order to increase the base injection amount Qb when the water temperature THW is less than a predetermined temperature Tth (for example, 60° C.). More specifically, the low-temperature increase coefficient Kw is calculated to be a larger value when the water temperature THW is low than when the water temperature THW is high. When the water temperature THW is greater than or equal to the predetermined temperature Tth, the low-temperature increase coefficient Kw is set to 1 and the correction amount of the base injection amount Qb with the low-temperature increase coefficient Kw is set to 0.

The injection valve operation process M30 is a process for outputting the operation signal MS2 to the port injection valve 16 in order to operate the port injection valve 16. In particular, the injection valve operation process M30 is a process for causing the port injection valve 16 to inject the requested injection amount Qd, which is the amount of fuel requested to be supplied to a single cylinder in a single combustion cycle from the port injection valve 16.

Figure 11:
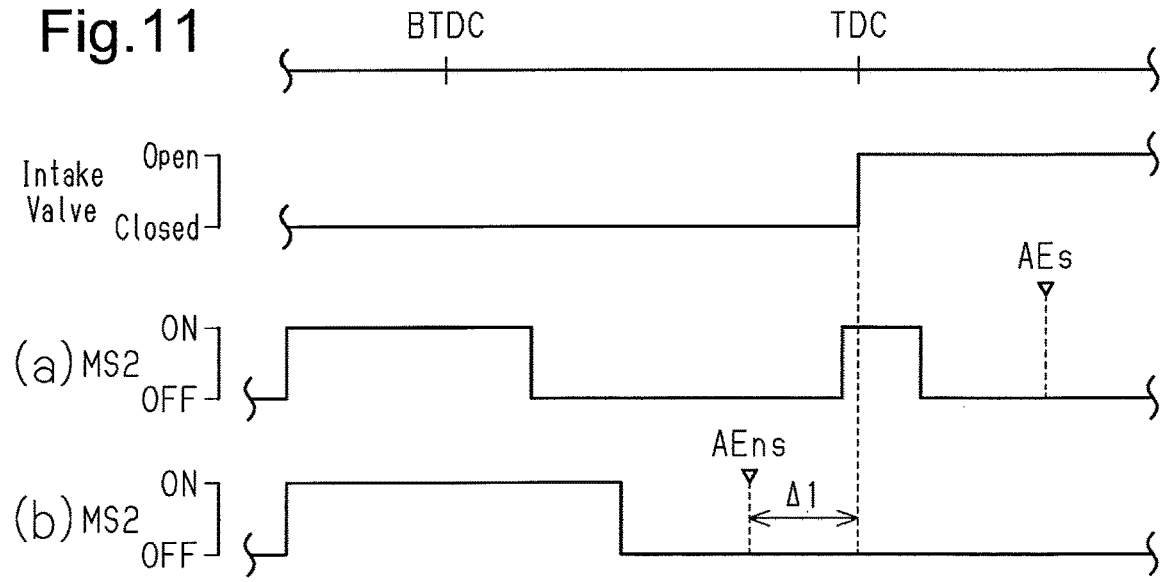
FIG. 11 is a timing diagram showing injection patterns in the internal combustion engine of FIG. 9, including section (a) and section (b).

The fuel injection processes of the present embodiment include two types of processes, namely, a process illustrated in section (a) of FIG. 11 and a process illustrated in section (b) of FIG. 11.

Section (a) of FIG. 11 illustrates the intake synchronous injection, which injects fuel in synchronization with the open period of the intake valve 18, and the intake asynchronous injection, which injects fuel at a timing advanced with respect to the timing of the intake synchronous injection. More specifically, the intake synchronous injection is to inject fuel such that the period in which the fuel injected from the port injection valve 16 reaches the position of the intake valve 18 prior to opening is within the open period of the intake valve 18. The position of the intake valve 18 prior to opening is the downstream end of the intake port, that is, an inlet IN of the combustion chamber 24 shown in FIG. 9. FIG. 9 shows a state in which the intake valve 18 is open. The starting point of the fuel-reaching period is the timing at which the fuel injected at the earliest timing in the fuel injected from the port injection valve 16 reaches the position of the intake valve 18 prior to opening. The end point of the fuel-reaching period is the timing at which the fuel injected at the latest timing in the fuel injected from the port injection valve 16 reaches the position of the intake valve 18 prior to opening. The intake asynchronous injection is to inject fuel such that the fuel injected from the port injection valve 16 reaches the intake valve 18 before the intake valve 18 opens. In other words, in the intake asynchronous injection, the fuel injected from the port injection valve 16 remains in the intake passage 12 until the intake valve 18 opens and flows into the combustion chamber 24 after the intake valve 18 opens. In, the present embodiment, in the intake asynchronous injection, fuel is injected such that the period in which the fuel injected from the port injection valve 16 reaches the position of the intake valve 18 prior to opening is within the closed period of the intake valve 18.

Section (b) of FIG. 11 illustrates the single injection process for executing only the intake asynchronous injection.

In the present embodiment, the multiple injection process is executed with the intention of reducing the number (PN) of particulate matter (PM) in exhaust gas. That is, in a case in which the temperature of the intake system of the internal combustion engine 10 such as the intake passage 12 and the intake valve 18 is low to a certain extent, PN tends to increase when the single injection process is executed in a region where the charging efficiency η is high to a certain extent. This may be because the requested injection amount Qd is larger when the charging efficiency η is high than when the charging efficiency η is low and thus the amount of fuel collecting on the intake system increases. More specifically, when the amount of fuel collecting on the intake system increases to a certain extent, shearing the collected fuel presumably causes some of the collected fuel to flow into the combustion chamber 24 in a state in which they remain droplets. Thus, in the present embodiment, some of the requested injection amount Qd is injected using the intake synchronous injection. Thus, even when the requested injection amount Qd is large, injecting some of the requested injection amount Qd reduces the amount of fuel collecting on the intake system considering a large amount of the requested injection amount Qd and consequently reduces PN.

Figure 12:
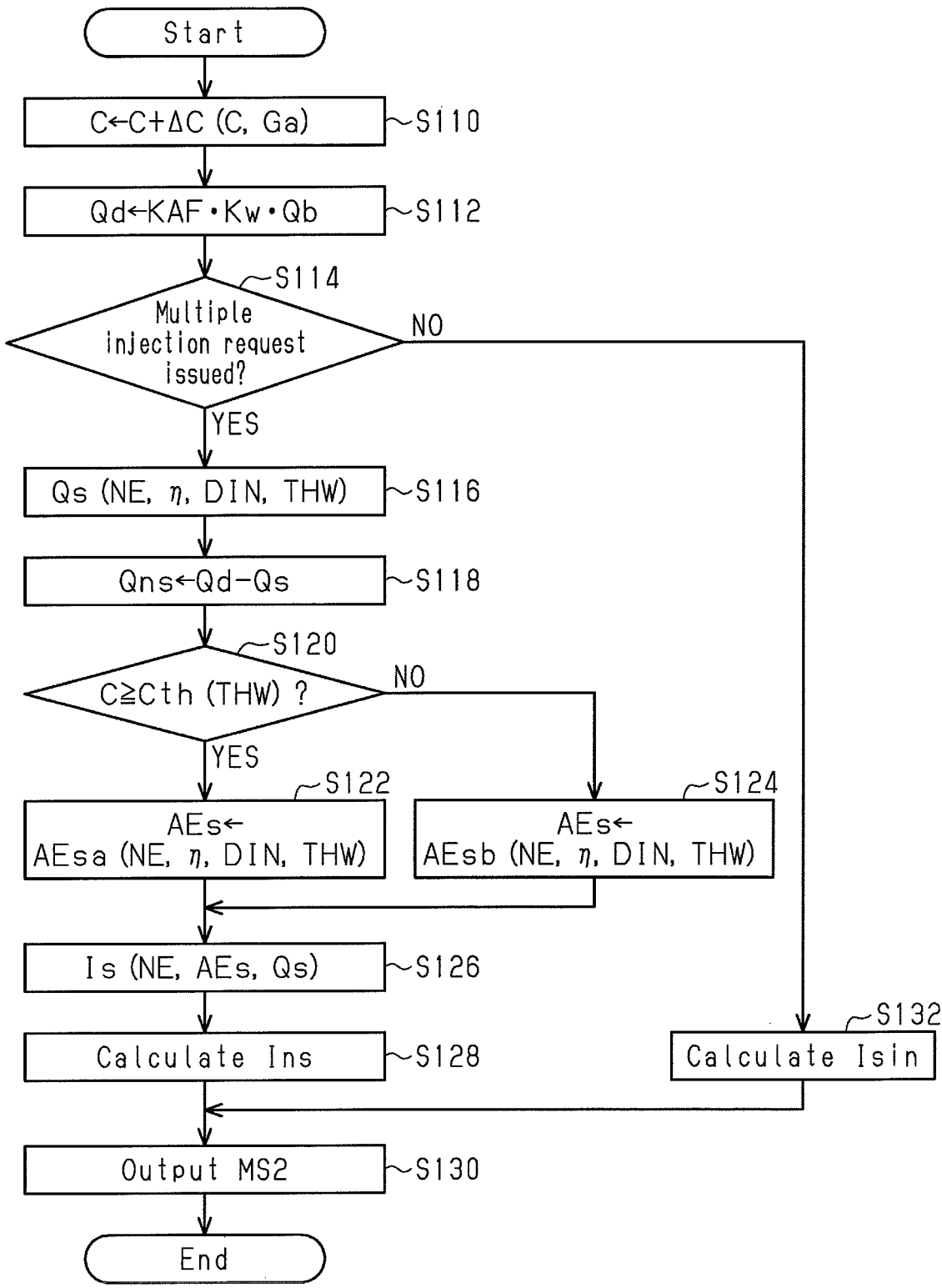
FIG. 12 is a flowchart illustrating a procedure for an injection valve operation process in the internal combustion engine of FIG. 9.

FIG. 12 illustrates a procedure for the injection valve operation process M30. The processes shown in FIG. 12 are executed by the CPU 52 repeatedly executing programs stored in the ROM 54, for example, in a predetermined cycle. In the following description, the number of each step is represented by the letter S followed by a numeral.

In the series of processes shown in FIG. 12, the CPU 52 first updates the value of a warm-up counter C using an update amount ΔC (S110). The warm-up counter C is a parameter that correlates with the parameter of the catalyst 34. The CPU 32 calculates the update amount ΔC to be a greater value when the intake air amount Ga is large than when the intake air amount Ga is small. When the intake air amount Ga is small, the update amount ΔC may be a value smaller than zero. Further, even if the intake air amount Ga is the same, the CPU 52 calculates the update amount ΔC to be smaller when the value of the warm-up counter C is large than when the value of the warm-up counter C is small. Such a process is performed in view of the fact that the progress of warm-up limits an increase in the temperature of the catalyst 34. This process can be implemented by the CPU 52 performing map calculation for the update amount ΔC in a state in which the ROM 54 stores in advance map data that includes the warm-up counter C and the intake air amount Ga as input variables and the update amount ΔC as an output variable.

The map data refers to a data set of discrete values of input variables and values of output variables each corresponding to a value of the input variables. When the value of an input variable matches any of the values of the input variable on the map data, the map calculation uses the value of the corresponding output variable on the map data as the calculation result. When the value of the input variable does not match any of the values of the input variable on the map data, the map calculation uses a value obtained by interpolation of multiple values of the output variable included in the map data set as the calculation result.

Next, the CPU 52 calculates the requested injection amount Qd by multiplying the low-temperature increase coefficient Kw and the feedback correction coefficient KAF by the base injection amount Qb (S112). Then, the CPU 52 determines whether the multiple injection request has been issued (S114). The CPU 52 determines that the request for executing the multiple injection process has been issued when the logical conjunction of condition (Vi), condition (Vii), and condition (Viii) is true. Condition (Vi) is that the water temperature THW is less than or equal to the given temperature Tth. Condition (Vii) is that the charging efficiency η is greater than or equal to a given value. Condition (Viii) is that the rotation speed NE is less than or equal to the predetermined speed NEth. Condition (Viii) is used to set the time interval between the end timing of the intake asynchronous injection and the start timing of the intake synchronous injection to be greater than or equal to the predetermined time. Further, this condition is that since the multiple injection process produces a larger load than the single injection process, an increase in the calculation load of the control device 50 prevents the heat-generation amount from becoming excessively large. The above-described predetermined time is determined in accordance with the structure of the port injection valve 16 and is a value that prevents the intake synchronous injection from starting before the intake asynchronous injection ends.

When determining that the multiple injection request has been issued (S114: YES), the CPU 52 calculates the synchronous injection amount Qs, which is an injection amount of the intake synchronous injection (S116). The CPU 52 calculates the synchronous injection amount Qs in accordance with the rotation speed NE, the charging efficiency η, the intake phase difference DIN, and the water temperature THW. The synchronous injection amount Qs is adapted to an appropriate value for reducing PN. More specifically, the CPU 52 performs map calculation for the synchronous injection amount Qs in a state in which the ROM 54 stores in advance map data including the rotation speed NE, the charging efficiency η, the intake phase difference DIN, and the water temperature THW as input variables and including the synchronous injection amount Qs as an output variable.

Subsequently, the CPU 52 subtracts the synchronous injection amount Qs from the requested injection amount Qd to calculate the asynchronous injection amount Qns, which is an injection amount of the intake asynchronous injection (S118).

Thus, the sum of the asynchronous injection amount Qns and the synchronous injection amount Qs is equal to the requested injection amount Qd. That is, the processes of S116 and S118 are performed to split the requested injection amount Qd of fuel into the asynchronous injection amount Qns and the synchronous injection amount Qs. The synchronous injection amount Qs is unaffected by the values of the feedback correction coefficient KAF and the low-temperature increase coefficient Kw. The reason for fixing the synchronous injection amount Qs is that the synchronous injection amount Qs is adapted to an appropriate value for reducing PN and PN may increase if the synchronous injection amount Qs is greatly changed by correction.

Subsequently, the CPU 52 determines whether the warm-up counter C is greater than or equal to a threshold value Cth (S120). This process is a process for determining whether the temperature of the catalyst 34 is greater than or equal to the given value at which the catalyst 34 is in an activation state. In the activation state, for example, the temperature of the central portion of the catalyst 34 simply needs to be a temperature at which a removal rate is greater than or equal to 50%. More specifically, the CPU 52 sets the threshold value Cth to be smaller when the water temperature THW is high than when the water temperature THW is low.

When determining that the warm-up counter C is greater than or equal to the threshold value Cth (S120: YES), the CPU 52 determines that the catalyst 34 is in the activation state and calculates the reach end timing AEs, which is shown in section (a) of FIG. 11, based on the rotation speed NE, the charging efficiency the intake phase difference DIN, and the water temperature THW (S122). The reach end timing AEs refers to the target value of a timing at which fuel injected at the latest timing in the fuel injected from the port injection valve 16 reaches the position (IN in FIG. 9) in the closed period of the intake valve 18. When the rotation speed NE differs, the flow speed of fluid in the intake passage 12 changes. This differentiates the amount of fuel collecting on and remains in the intake system without flowing into the combustion chamber 24. Further, when the rotation speed NE differs, the rotation amount of the crankshaft 28 differs during a period in which a predetermined amount of fuel vaporizes in the fuel injected from the port injection valve 16. Thus, a suitable reach end timing AEs for reducing PN depends on the rotation speed NE. Furthermore, when the charging efficiency η differs, the base injection amount Qb differs and consequently the amount of fuel collecting on the intake system differs. Additionally, when the charging efficiency η differs, the pressure in the intake passage 12 changes and the ease of atomization of fuel differs. Thus, a suitable reach end timing AEs for reducing PN depends on the charging efficiency η. An optimal timing for reducing PN is shifted to the retarded side because the amount of fuel collecting on and remaining in the intake system without flowing into the combustion chamber 24 is increased because it is more difficult for fuel to be vaporized in the intake system when the water temperature THW is low than when the water temperature THW is high. Thus, a suitable reach end timing AEs for reducing PN depends on the water temperature THW. Further, when the overlap amount of the intake valve 18 and the exhaust valve 30 changes in accordance with the intake phase difference DIN, an internal EGR amount changes. Thus, the ease of vaporization of fuel in the intake system changes as the temperature of the intake system increases, and the amount of fuel collecting on and remaining in the intake system without flowing into the combustion chamber 24 changes. Accordingly, a suitable reach end timing AEs for reducing PN depends on the intake phase difference DIN.

More specifically, the CPU 52 performs map calculation for a reach end timing AEsa during the activation of the catalyst in a state in which the ROM 54 stores in advance map data including the rotation speed NE, the charging efficiency the intake phase difference DIN, and the water temperature THW as input variables and including the reach end timing AEsa as an output variable, and the reach end timing AEsa is set as the reach end timing AEs.

When determining that the warm-up counter C is less than the threshold value Cth (S120: NO), the CPU 52 calculates a reach end timing AEsb prior to the activation of the catalyst and sets the reach end timing AEsb as the reach end timing AEs (S124). More specifically, the CPU 52 performs map calculation for the reach end timing AEsb prior to the activation of the catalyst in a state in which the ROM 54 stores in advance map data including the rotation speed NE, the charging efficiency η, the intake phase difference DIN, and the water temperature THW as input variables and including the reach end timing AEsb as an output variable, and the reach end timing AEsb is set as the reach end timing AEs. The reach end timing AEsb prior to the activation of the catalyst is set to be more advanced than the reach end timing AEsa when the catalyst 34 is in the activation state.

When completing the processes of S122 and S124, the CPU 52 calculates the injection start timing Is (crank angle) of the intake synchronous injection based on the reach end timing AEs, the synchronous injection amount Qs, and the rotation speed NE (S126). The CPU 52 calculates the injection start timing Is of the intake synchronous injection to be more advanced when the synchronous injection amount Qs is large than when the synchronous injection amount Qs is small. Further, the CPU 52 calculates the injection start timing Is of the intake synchronous injection to be more advanced when the rotation speed NE is high than when the rotation speed NE is low. More specifically, the CPU 52 sets, as the injection start timing Is of the intake synchronous injection, the timing advanced with respect to the reach end timing AEs by the value obtained by adding the injection period, the travel time, and the invalid injection time of the port injection valve 16, which are determined by the synchronous injection amount Qs. The travel time refers to a required time for the fuel injected from the port injection valve 16 to reach the inlet IN of the combustion chamber 24. In the present embodiment, the travel time is a fixed value. The invalid injection time refers to the time by which fuel injection actually starts after the operation signal MS2, which causes the port injection valve 16 to open, is output.

Next, the CPU 52 calculates the injection start timing Ins of the intake asynchronous injection based on the injection start timing Is of the intake synchronous injection (S128). The calculation is performed such that the time interval between the injection end timing of the intake asynchronous injection and the injection start timing Is of the intake synchronous injection is greater than or equal to the above-described predetermined time.

The above-described process is performed to set the injection start timing Is of the intake synchronous injection independently from the injection start timing Ins of the intake asynchronous injection. This is because the reach end timing AEs of the intake synchronous injection is easily affected in particular by PN and HC in exhaust gas.

The CPU 52 operates the port injection valve 16 by outputting the operation signal MS2 to the port injection valve 16 so that the fuel of the asynchronous injection amount Qns is injected at the injection start timing Ins and then the fuel of the synchronous injection amount Qs is injected at the injection start timing Is of the intake synchronous injection (S130).

When determining that no request for the multiple injection process has been issued (S114: NO), the CPU 52 calculates an injection start timing Isin of the single injection (S132). More specifically, as shown in section (b) of FIG. 11, the CPU 52 sets, as the reach end timing AEns, the timing advanced by the predetermined amount Δ1 with respect to the timing at which the intake valve 18 starts opening. Subsequently, the CPU 52 sets, as the injection start timing Isin of the single injection, the timing advanced with respect to the reach end timing AEns by a value obtained by adding the injection period, the travel time, and the invalid injection time of the port injection valve 16, which are determined by the requested injection amount Qd. Referring back to FIG. 12, the CPU 52 operates the port injection valve 16 by outputting the operation signal MS2 of the port injection valve 16 to cause the fuel of the requested injection amount Qd to be injected at the injection start timing Isin of the single injection (S130).

When completing the process of steps S130, the CPU 52 temporarily ends the series of processes shown in FIG. 12.

The operation and advantage of the present embodiment will now be described.

Figure 13:
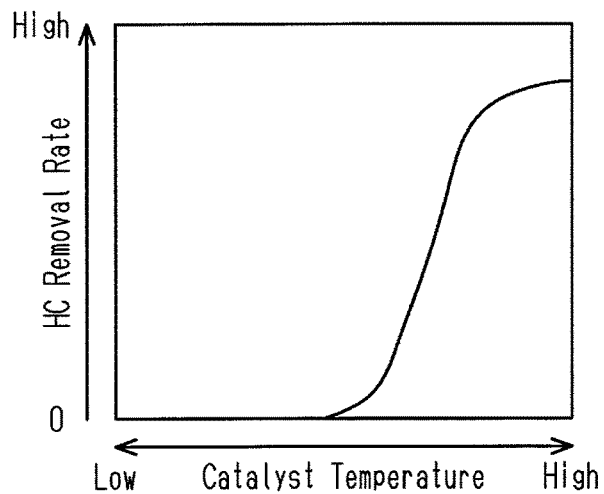
FIG. 13 is a graph showing the relationship between a catalyst temperature and a HC removal rate.

In a case in which the request for executing the multiple injection process has been issued, the CPU 52 sets the reach end timing AEs to be more advanced, for example, when the warm-up counter C is less than the threshold value Cth than when the warm-up counter C is greater than or equal to the threshold value Cth. This is because while the removal rate of HC is lower when the temperature of the catalyst 34 is low than when the temperature of the catalyst 34 is high as shown in FIG. 13, the emission of HC is limited as the reach end timing AEs becomes advanced as shown in FIG. 14B.

Figure 14A:
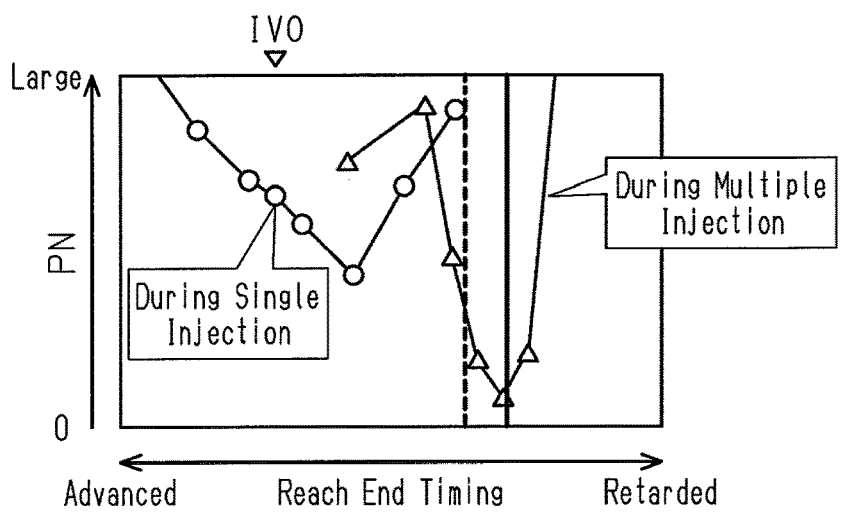
FIG. 14A is a graph showing the relationship between a reach end timing and the emission amount of PN in the internal combustion engine of FIG. 9.
Figure 14B:
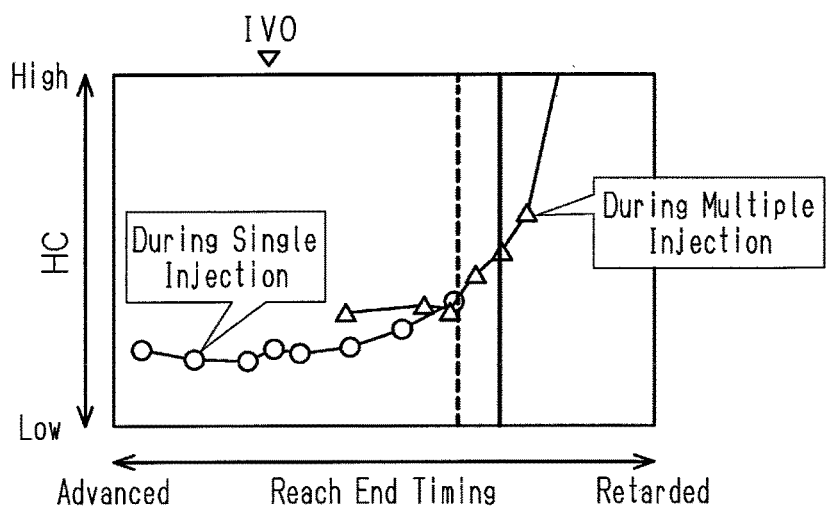
FIG. 14B is a graph showing the relationship between the reach end timing and the emission amount of HC in the internal combustion engine of FIG. 9.

FIG. 14A shows the relationship between the reach end timings AEs and AEns with the concentration of PN in exhaust gas. FIG. 14B shows the relationship between the reach end timings AEs and AEns with the concentration of HC in exhaust gas. More specifically, the values of PN and HC related to the reach end timing AEs are the ones described as "During Multiple Injection," and the values of PN and HC related to the reach end timing AEns are the ones described as "During Single Injection." In both FIGS. 14A and 14B, the vertical solid lines show an optimal reach end timing AEs for reducing PN, and the broken lines show a suitable reach end timing AEs for reducing HC. The optimal reach end timing AEs is more advanced than the suitable reach end timing AEs. This is because the more advanced the reach end timing AEs becomes, the longer the time that can be used for the atomization of fuel.

When the temperature of the catalyst 34 is low, a suitable reach end timing AEsb for reducing HC is used by the CPU 52 to reduce HC in exhaust gas, and the CPU 52 consequently reduces HC flowing to the downstream part of the catalyst 34. In this case, PM flowing to the downstream part of the catalyst 34 is captured by the GPF 136. When the temperature of the catalyst 34 is high, a suitable reach end timing AEsa for reducing PN is used by the CPU 52 to reduce PN in exhaust gas. In this case, HC in exhaust gas is sufficiently removed by the catalyst 34.

Fifth Embodiment

A fifth embodiment will now be described with reference to FIG. 15. The differences from the fourth embodiment will mainly be discussed.

Figure 15:
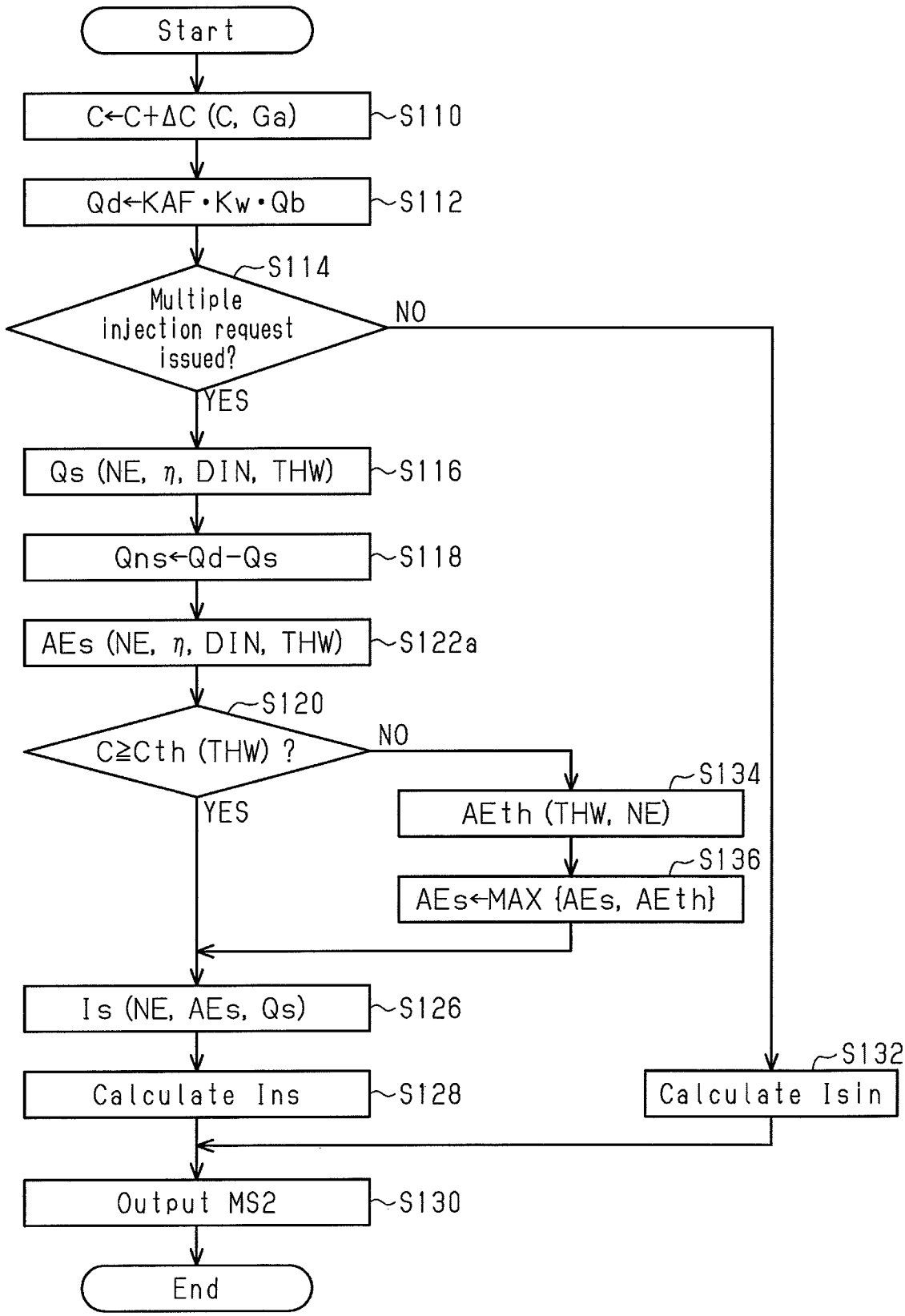
FIG. 15 is a flowchart showing a procedure for an injection valve operation process according to a fifth embodiment of the present disclosure.

FIG. 15 illustrates a procedure for the injection valve operation process M30. The processes shown in FIG. 15 are executed by the CPU 52 repeatedly executing programs stored in the ROM 54, for example, in a predetermined cycle. In FIG. 15, the same step numbers are given to the processes that correspond to those in FIG. 12.

After calculating the asynchronous injection amount Qns (S118), the CPU 52 calculates the reach end timing AEs based on the rotation speed NE, the charging efficiency η, the intake phase difference DIN, and the water temperature THW (S122a). The reach end timing AEs is a suitable timing for reducing PN and corresponds to the reach end timing AEsa calculated in the process of S122. Subsequently, the CPU 52 determines whether the warm-up counter C is greater than or equal to the threshold value Cth (S120). When determining that the warm-up counter C is greater than or equal to the threshold value Cth (S120: YES), the CPU 52 calculates the injection start timing Is of the intake synchronous injection using the reach end timing AEs calculated in the process of S122a (S126).

When determining that the warm-up counter C is less than the threshold value Cth (S120: NO), the CPU 52 calculates a retarded guard value AEth of the reach end timing AEs based on the water temperature THW and the rotation speed NE (S134). The retarded guard value AEth is set in accordance with the most retarded angle to set the HC concentration in exhaust gas to be tolerable before the activation of the catalyst 34. More specifically, the CPU 52 performs map calculation for the retarded guard value AEth in a state in which the ROM 54 stores in advance map data including the rotation speed NE and the water temperature THW as input variables and including the retarded guard value AEth as an output variable.

Subsequently, the CPU 52 substitutes, into the reach end timing AEs, the more advanced one of the retarded guard value AEth and the reach end timing AEs calculated in the process of S122a (S136). More specifically, the reach end timing AEs is represented by an angle relative to the reference angle and is set to a positive value that is more advanced than the reference angle. The larger one of the reach end timing AEs and the retarded guard value AEth is substituted into the reach end timing AEs.

Then, the CPU 52 uses the reach end timing AEs calculated in the process of S136 to calculate the injection start timing Is of the synchronous injection (S126).

In this manner, in the present embodiment, the retarded guard value AEth is used to determine a suitable reach end timing AEs for reducing HC. Such a process is performed in view of the fact that a suitable timing for reducing HC is not affected by the intake phase difference DIN and the charging efficiency η as easily as a suitable timing for reducing PN. As compared to the process of S124 in FIG. 12, the reach end timing AEs that is suitable for reducing HC and allows for maximally reducing PN can be easily adapted.

Correspondence

The correspondence between the items in the above embodiments and the items described in the above-described SUMMARY is as follows. In the following description, the correspondence is shown for each of the numbers in the examples described in the SUMMARY.

[8] The multiple injection process corresponds to the process of S130 executed subsequent to the process of S128. The advancement process corresponds to the processes of S120 to S124 in FIG. 12 and the processes of S122a, S120, S134, and S136 in FIG. 15.

[9] The valve actuation variable device corresponds to the intake valve timing adjustment device 44, and the valve actuation controlling process corresponds to the target intake phase difference calculation process M12 and the intake phase difference control process M14. The variably setting process corresponds to the processes of S122 and S124 in FIG. 12 and the process of S122a in FIG. 15.

The reference timing setting process corresponds to the process of S122a in FIG. 15, and the guard value setting process corresponds to the process of S134 in FIG. 15. The low-temperature timing setting process corresponds to the process of S136 in FIG. 15.

The requested injection amount calculation process corresponds to the process of S112.

The temperature of the intake system corresponds to the water temperature THW. Modifications The above-described embodiments may be modified as follows. The above-described embodiment and the following modifications may be implemented in combination with each other as long as technical contradiction does not occur.

Guard Value Setting Process

In the above-described embodiment, the retarded guard value AEth is calculated based on the water temperature THW and the rotation speed NE. Instead, the retarded guard value AEth may be calculated using only one (for example, water temperature THW) of the two parameters, namely, the water temperature THW and the rotation speed NE.

Variably Setting Process

In the above-described embodiment, the reach end timings AEs, AEsa, and AEsb are set based on the rotation speed NE, the charging efficiency η, the water temperature THW, and the intake phase difference DIN. Instead, for example, the base injection amount Qb may be used instead of the charging efficiency η as a parameter that indicates the amount of air filling the combustion chamber 24 (parameter indicating load). Alternatively, the reach end timings AEs, AEsa, and AEsb may be variably set based only on two or three of the four parameters, namely, the rotation speed NE, the load, the water temperature THW, and the intake phase difference DIN. As another option, for example, the reach end timings AEs, AEsa, and AEsb may be variably set based only on one (for example, intake phase difference DIN) of the four parameters, namely, the rotation speed NE, the load, the water temperature THW, and the intake phase difference DIN.

As another alternative, instead of calculating the reach end timings AEs, AEsa, and AEsb, a retardation amount with respect to the opening start timing of the intake valve 18 may be set. The retardation amount may be variably set based on a parameter of the parameters used to calculate the reach end timing AEs other than the intake phase difference DIN.

The injection start timing Is of the intake synchronous injection does not have to be calculated after calculating the reach end timings AEs, AEsa, and AEsb and the retardation amount. Instead, for example, the injection start timing Is of the intake synchronous injection may be calculated based on map data that includes the injection start timing Is of the intake synchronous injection as an output variable and includes, as an input variable, one (for example, intake phase difference DIN) of the four parameters, namely, the rotation speed NE, the load, the water temperature THW, and the intake phase difference DIN. Alternatively, for example, the injection start timing Is of the intake synchronous injection may be calculated based on map data that includes the injection start timing Is of the intake synchronous injection as an output variable and includes two (for example, rotation speed NE and charging efficiency of the above-described four parameters as input variables. In this case, the calculated injection start timing Is of the intake synchronous injection may be corrected in accordance with the water temperature THW. As another option, for example, the injection start timing Is of the intake synchronous injection may be calculated based on map data that includes the injection start timing Is of the intake synchronous injection as an output variable and includes three (for example, rotation speed NE, charging efficiency η, and intake phase difference DIN) of the above-described four parameters. In this case, the calculated injection start timing Is of the intake synchronous injection may be corrected in accordance with the water temperature THW. As another option, for example, the injection start timing Is of the intake synchronous injection may be calculated based on map data that includes the rotation speed NE, the charging efficiency η, the intake phase difference DIN, and the water temperature THW as input variables and the injection start timing Is of the intake synchronous injection as an output variable.

Temperature of Catalyst

In the above-described embodiment, the temperature of the catalyst 34 is calculated using the warm-up counter C. Instead, the temperature of the catalyst 34 may be calculated using a mere integration value of the intake air amount Ga. A process for updating the integration value is a process for updating the integration value using an update amount that is unambiguously determined by the intake air amount Ga regardless of the magnitude of the integration value. Alternatively, the catalyst 34 may include a temperature sensor such as a thermocouple, and a detection value of the temperature sensor may be used.

Temperature of Intake System

In the above-described embodiment, the water temperature THW is used as the temperature of the intake system. Instead, for example, the temperature of lubricant for the internal combustion engine 10 may be used.

Requested Injection Amount

The requested injection amount Qd may be obtained by correcting the base injection amount Qb with a learning value LAF in addition to the low-temperature increase coefficient Kw and the feedback correction coefficient KAF. The process for calculating the learning value LAF is a process for updating the learning value LAF so as to reduce the correction factor of the base injection amount Qb using the feedback correction coefficient KAF as an input. It is desired that the learning value LAF be stored in an electrically rewritable non-volatile memory.

Further, for example, feedforward control based on the ratio of a disturbing fuel may be used to calculate the requested injection amount Qd such that the requested injection amount Qd is smaller when the disturbing fuel ratio is large than when the disturbing fuel ratio is small. The disturbing fuel ratio is the ratio of the amount of fuel (disturbing fuel) flowing into the combustion chamber 24 of the internal combustion engine 10 other than the fuel injected from the port injection valve 16 in a single combustion cycle to the total amount of fuel flowing into the combustion chamber 24. For example, when the internal combustion engine includes a canister that captures fuel vapor from a fuel tank storing fuel to be injected from the port injection valve 16 and includes an adjustment device that adjusts the amount of fluid in the canister flowing into the intake passage 12, the above-described disturbing fuel includes fuel vapor flowing into the canister to the intake passage 12. Additionally, for example, when the internal combustion engine includes a system that returns fuel vapor in the crankcase to the intake passage 12, the disturbing fuel includes fuel vapor flowing from the crankcase into the intake passage 12.

During a cold start of the internal combustion engine 10, the injection amount is large regardless of the charging efficiency η. Thus, PN tends to increase when the single injection process is executed. Thus, since the airflow meter 62 cannot accurately calculate the intake air amount Ga at the start time, the multiple injection process may be executed even when the requested injection amount Qd is determined based on the water temperature THW regardless of the intake air amount Ga. Even in this case, it is effective to set the injection start timing Is of the intake synchronous injection to be more advanced when the temperature of the catalyst 34 is low than when the temperature of the catalyst 34 is high.

Intake Asynchronous Injection of Multiple Injection Process

In the above-described embodiment, the intake asynchronous injection is to inject fuel such that the period in which the fuel injected from the port injection valve 16 reaches the position of the intake valve 18 prior to opening is within the closed period of the intake valve 18. Instead, when the rotation speed NE is high and the asynchronous injection amount Qns is excessively large, part of the period in which the fuel injected from the port injection valve 16 reaches the position of the intake valve 18 prior to opening may overlap the open period of the intake valve 18.

Single Injection Process

In the above-described embodiment, the single injection process is to inject fuel such that the period in which the fuel injected from the port injection valve 16 reaches the position of the intake valve 18 prior to opening is within the closed period of the intake valve 18. Instead, when the requested injection amount Qd is large, part of the period in which the fuel injected from the port injection valve 16 reaches the position of the intake valve 18 prior to opening may overlap the open period of the intake valve 18. The single injection process does not have to be executed.

Splitting of Requested Injection Amount

In the above-described embodiment, the synchronous injection amount Qs is variably set based on the rotation speed NE, the charging efficiency η, the water temperature THW, and the intake phase difference DIN. Instead, for example, the base injection amount Qb may be used instead of the charging efficiency η as a load parameter that indicates the amount of air filling the combustion chamber 24. Further, the synchronous injection amount Qs may be variably set based on only three, two, or one of the four parameters, namely, the load parameter, the rotation speed NE, the water temperature THW, and the intake phase difference DIN. It is desired that the synchronous injection amount Qs be variably set using at least one of the load parameter and the water temperature THW as much as possible. Alternatively, other than the four parameters, the intake pressure and the flow speed of intake air may be used. The four parameters allow the intake pressure and the flow speed of intake air to be obtained.

Splitting the requested injection amount Qd by calculating the synchronous injection amount Qs does not have to be performed. Instead, for example, the synchronous injection ratio Ks, which is the ratio of the synchronous injection amount Qs to the base injection amount Qb, may be determined in accordance with the load or the like. Alternatively, the synchronous injection amount Qs may be, for example, a value obtained by splitting, using the synchronous injection ratio Ks, the value (KAF·Qb) obtained by correcting the base injection amount Qb by the feedback correction coefficient KAF. In this case, the synchronous injection amount Qs is Ks·KAF·Qb.

Valve Actuation Controlling Process

In the above-described embodiment, the target intake phase difference DIN* is variably set in accordance with the rotation speed NE and the charging efficiency η. Instead, for example, except when the water temperature THW is low, an actual timing may be limited to retarded with respect to the open timing of the intake valve 18 that is determined in accordance with the rotation speed NE and the charging efficiency η.

Actuation Varying Device for Intake Valve

The actuation varying device that changes the actuation of the intake valve 18 is not limited to the intake valve timing adjustment device 44. For example, the actuation varying device may be a device that changes a lift amount. In this case, the parameter indicating the valve actuation of the intake valve 18 is the lift amount or the like instead of the intake phase difference DIN.

Control Device

The control device is not limited to a device that includes the CPU 52 and the ROM 54 and executes software processing. For example, at least part of the processes executed by the software in the above-illustrated embodiment may be executed by hardware circuits dedicated to executing these processes (such as ASIC). That is, the control device may be modified as long as it has any one of the following configurations (a) to (c). (a) A configuration including a processor that executes all of the above-described processes according to programs and a program storage device such as a ROM (including a non-transitory computer readable medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Others

The internal combustion engine 10 does not need to include the actuation varying device that changes the actuation of the intake valve 18. The internal combustion engine 10 does not need to include the throttle valve 14.

The GPF 136 does not have to be provided.

The invention claimed is:

1. A control device for an internal combustion engine, the internal combustion engine to which the control device is applied including a port injection valve that injects fuel into an intake passage, wherein the control device is configured to execute:

a multiple injection process for executing an intake synchronous injection and an intake asynchronous injection to inject fuel of a requested injection amount by operating the port injection valve, the requested injection amount being requested in a single combustion cycle, the intake synchronous injection injecting fuel in synchronization with an open period of an intake valve, the intake asynchronous injection injecting fuel at a timing advanced with respect to a timing of the intake synchronous injection; and a variably setting process for variably setting an injection timing of the intake synchronous injection based on at least two parameters of three parameters, the injection timing of the intake synchronous injection being represented by a rotation angle of a crankshaft of the internal combustion engine, the three parameters referring to a rotation speed of the crankshaft of the internal combustion engine, an opening start timing of the intake valve that changes an overlap amount of the intake valve and an exhaust valve, and a temperature of an intake system of the internal combustion engine.

2. The control device according to claim 1, wherein
the control device is further configured to execute a requested injection amount calculation process for calculating the requested injection amount as an injection amount to control an air-fuel ratio to a target air-fuel ratio based on an amount of fresh air filling a cylinder of the internal combustion engine, and the variably setting process is a process for variably setting the injection timing of the intake synchronous injection based on load of the internal combustion engine in addition to the at least two parameters.

3. The control device according to claim 2, wherein the variably setting process includes
an end timing setting process for variably setting a reach end timing based on the rotation speed, the temperature of the intake system, and the load, the reach end timing being a target value of a timing at which fuel injected from the port injection valve at a latest timing reaches an inlet of a combustion chamber of the internal combustion engine, and a start timing calculation process for calculating an injection start timing of the intake synchronous injection based on the reach end timing.

4. The control device according to claim 3, wherein
the internal combustion engine includes a valve actuation variable device configured to vary a valve actuation of the intake valve,
the control device is further configured to execute a valve actuation controlling process for variably controlling the opening start timing of the intake valve by operating the valve actuation variable device,
the end timing setting process includes a retardation amount calculation process for calculating a retardation amount of the reach end timing with respect to the opening start timing of the intake valve based on the rotation speed, the temperature of the intake system, and the load, and
the end timing setting process is a process for setting, as the reach end timing, a timing retarded by the retardation amount with respect to the opening start timing of the intake valve.

5. The control device according to claim 1, wherein the variably setting process includes an end timing setting process for variably setting a reach end timing based on the rotation speed of the crankshaft, the reach end timing being a target value of a timing at which fuel injected from the port injection valve at a latest timing reaches an inlet of a combustion chamber of the internal combustion engine, and a start timing calculation process for calculating an injection start timing of the intake synchronous injection based on the reach end timing.

6. The control device according to claim 5, wherein the end timing setting process includes a process for variably setting the reach end timing based on the load of the internal combustion engine in addition to the rotation speed.

7. The control device according to claim 6, wherein
the internal combustion engine includes a valve actuation variable device configured to vary a valve actuation of the intake valve,
the control device further executes a valve actuation controlling process for variably controlling the opening start timing of the intake valve by operating the valve actuation variable device,
the end timing setting process includes a retardation amount calculation process for calculating a retardation amount of the reach end timing with respect to the opening start timing of the intake valve based on the rotation speed and the load, and
the end timing setting process is a process for setting, as the reach end timing, a timing retarded by the retardation amount with respect to the opening start timing of the intake valve.

8. The control device according to claim 1, wherein
the internal combustion engine further includes a catalyst that purifies exhaust gas discharged to an exhaust passage,
the requested injection amount is a fuel amount injected from the port injection valve in the multiple injection process in order to control an air-fuel ratio to a target air-fuel ratio, and
the control device is further configured to execute an advancement process for setting the injection timing of the intake synchronous injection to be more advanced when a temperature of the catalyst is low than when the temperature of the catalyst is high.

9. The control device according to claim 8, wherein
the internal combustion engine includes a valve actuation variable device configured to vary a valve actuation of the intake valve,
the control device is further configured to execute a valve actuation controlling process for variably controlling an opening start timing of the intake valve by operating the valve actuation variable device,
the variably setting process variably sets the injection timing of the intake synchronous injection in accordance with the opening start timing of the intake valve,
the variably setting process includes
a reference timing setting process for setting the injection start timing of the intake synchronous injection based on the opening start timing of the intake valve,
a guard value setting process for setting, in accordance with the temperature of the intake system of the internal combustion engine, a retarded guard value for a case of when the temperature of the catalyst is less than a given value, and
a low-temperature timing setting process for setting, as the injection timing of the intake synchronous injection, a more advanced timing of the retarded guard value and an injection timing set through the reference timing setting process when the temperature of the catalyst is less than the given value, and the variably setting process is a process for setting, as the injection timing of the intake synchronous injection, the injection timing set through the reference timing setting process when the temperature of the catalyst is greater than or equal to the given value.

10. A control method for an internal combustion engine, the internal combustion engine including a port injection valve that injects fuel into an intake passage, wherein the control method comprises:

executing an intake synchronous injection and an intake asynchronous injection to inject fuel of a requested injection amount by operating the port injection valve, the requested injection amount being requested in a single combustion cycle, the intake synchronous injection injecting fuel in synchronization with an open period of an intake valve, the intake asynchronous injection injecting fuel at a timing advanced with respect to a timing of the intake synchronous injection; and variably setting an injection timing of the intake synchronous injection based on at least two parameters of three parameters, the injection timing of the intake synchronous injection being represented by a rotation angle of a crankshaft of the internal combustion engine, the three parameters referring to a rotation speed of the crankshaft of the internal combustion engine, an opening start timing of the intake valve that changes an overlap amount of the intake valve and an exhaust valve, and a temperature of an intake system of the internal combustion engine.

* * * * *